US011044300B2

(12) United States Patent
Dhanabalan et al.

(10) Patent No.: US 11,044,300 B2
(45) Date of Patent: Jun. 22, 2021

(54) FILE TRANSFER CONTROL SYSTEMS AND METHODS

(71) Applicant: Citrix Systems, Inc., Fort Lauderdale, FL (US)

(72) Inventors: Praveen Raja Dhanabalan, Bangalore (IN); Anuj Magazine, Bangalore (IN); Anudeep Athlur, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/658,298

(22) Filed: Oct. 21, 2019

(65) Prior Publication Data

US 2021/0120071 A1   Apr. 22, 2021

(51) Int. Cl.
*H04L 29/08* (2006.01)
*G06F 21/31* (2013.01)

(52) U.S. Cl.
CPC .............. *H04L 67/06* (2013.01); *G06F 21/31* (2013.01)

(58) Field of Classification Search
None
See application file for complete search history.

(56) References Cited

U.S. PATENT DOCUMENTS

| 8,613,070 B1 | 12/2013 | Borzycki et al. | |
| 2002/0073143 A1* | 6/2002 | Edwards | H04L 67/06 709/203 |
| 2002/0111912 A1* | 8/2002 | Hunter | H04H 60/65 705/52 |
| 2005/0060578 A1 | 3/2005 | Xue | |
| 2012/0030343 A1* | 2/2012 | Ryder | G06F 9/4856 709/224 |
| 2012/0124178 A1* | 5/2012 | Sparks | H04L 67/1078 709/219 |
| 2012/0159506 A1* | 6/2012 | Barham | G06F 9/5066 718/104 |
| 2012/0265803 A1* | 10/2012 | Ha | G06F 16/27 709/203 |
| 2013/0031155 A1* | 1/2013 | Terrano | H04L 67/06 709/201 |

(Continued)

FOREIGN PATENT DOCUMENTS

GB   2502739 A   12/2013

OTHER PUBLICATIONS

International Search Report and Written Opinion dated Jan. 12, 2021 for International Patent Application No. PCT/US2020/052076.

*Primary Examiner* — Scott B Christensen
(74) *Attorney, Agent, or Firm* — Pierce Atwood LLP

(57) ABSTRACT

Disclosed is a computing system capable of performing a method that involves determining that a first user is authorized to use each of a first device and a second device to access the computing system. The computing system may receive, from the first device, a file transfer request that identifies a first file, and may determine, based at least in part on the file transfer request, that the first file is to be transferred between the computing system and the second device. In response to the file transfer request and based at least in part on the first user being authorized to use each of the first and second devices to access the computing system, the computing system may cause the first file to be transferred between the computing system and the second device.

23 Claims, 13 Drawing Sheets

(56) References Cited

U.S. PATENT DOCUMENTS

| | | | |
|---|---|---|---|
| 2014/0006964 A1* | 1/2014 | Pan | G06F 3/0484 |
| | | | 715/738 |
| 2014/0108799 A1 | 4/2014 | Wang et al. | |
| 2014/0181258 A1* | 6/2014 | Modzelewski | H04L 67/06 |
| | | | 709/219 |
| 2014/0289189 A1* | 9/2014 | Chan | H04L 69/04 |
| | | | 707/610 |
| 2014/0325608 A1 | 10/2014 | Bacastow | |
| 2015/0052593 A1* | 2/2015 | Guo | H04L 63/168 |
| | | | 726/6 |
| 2016/0259568 A1* | 9/2016 | Grimsrud | G06F 13/4282 |
| 2019/0149593 A1* | 5/2019 | Greetham | G06F 9/445 |
| | | | 709/219 |
| 2020/0137436 A1* | 4/2020 | Dhanabalan | H04L 47/365 |

* cited by examiner

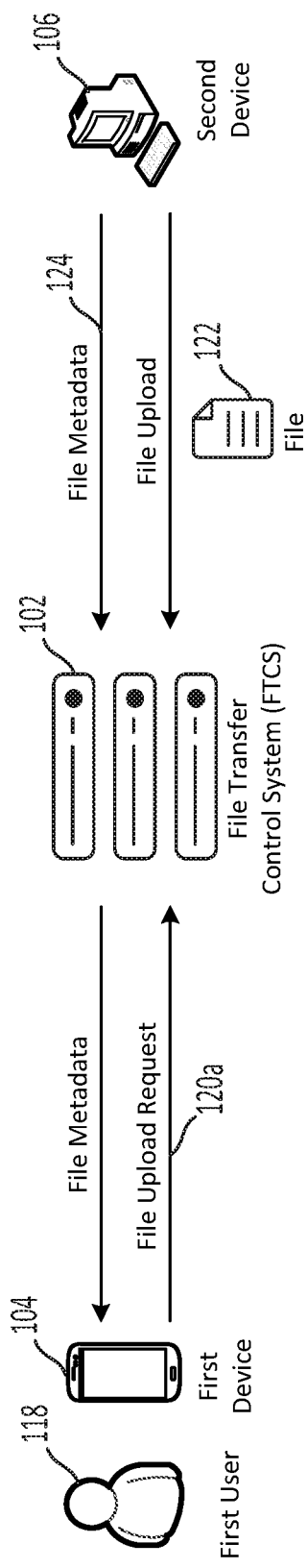
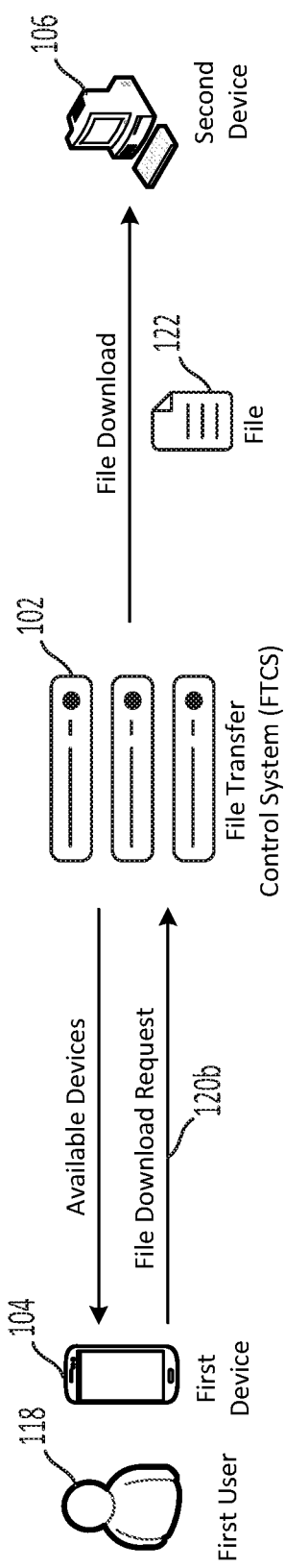

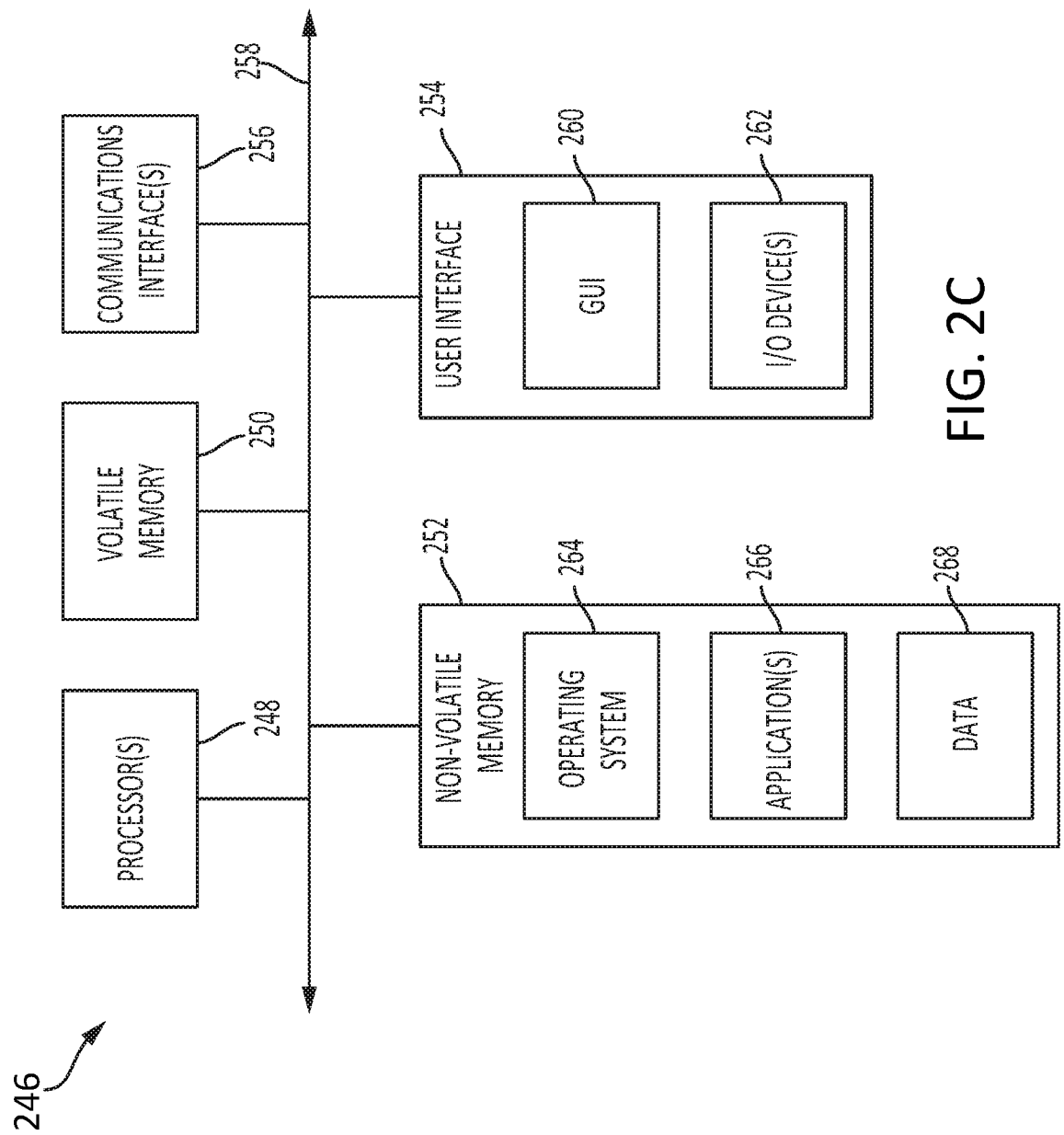

FILE TRANSFER CONTROL SYSTEMS AND METHODS

BACKGROUND

Various file sharing systems have been developed that allow users to store and/or retrieve files or other data to and/or from a repository. ShareFile®, offered by Citrix Systems, Inc., of Fort Lauderdale, Fla., is one example of a system that provides such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method performed by a computing system involves determining that a first user is authorized to use a first device to access the computing system, determining that the first user is authorized to use a second device to access the computing system, and receiving, from the first device, a file transfer request that identifies a first file. Based at least in part on the file transfer request, the computing system determines that the first file is to be transferred between the computing system and the second device. In response to the file transfer request and based at least in part on the first user being authorized to use each of the first and second devices to access the computing system, the computing system causes the first file to be transferred between the computing system and the second device.

In other disclosed embodiments, a method performed by a computing system involves determining that a first user is authorized to use a first device to access the computing system, determining that the first user is authorized to use a second device to access the computing system, and receiving, from the first device, a file transfer request that identifies a first file. The computing system determines that a first bandwidth of a first communication channel between the second device and the computing system is greater than a second bandwidth of a second communication channel between the first device and the computing system, and further determines based at least in part on the first bandwidth being greater than the second bandwidth, that the first file is to be transferred between the computing system and the second device. In response to the file transfer request and based at least in part on the first user being authorized to use each of the first and second devices to access the computing system, the computing system causes the first file to be transferred between the computing system and the second device.

In still other disclosed embodiments, a computing system comprises at least one processor and at least one computer-readable medium. The at least one computer-readable medium is encoded with instructions which, when executed by the at least one processor, cause the computing system to determine that a first user is authorized to use a first device to access the computing system, to determine that the first user is authorized to use a second device to access the computing system, to receive, from the first device, a file transfer request that identifies a first file, to determine, based at least in part on the file transfer request, that the first file is to be transferred between the computing system and the second device, and, based at least in part on the first user being authorized to use each of the first and second devices to access the computing system, to cause the first file to be transferred between the computing system and the second device in response to the file transfer request.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1B illustrates a first example implementation of the FTCS shown in FIG. 1A, in which the user of the first device can view files stored on the second device and remotely control the uploading of a file from the second device to the FTCS;

FIG. 1C illustrates a second example implementation of the FTCS shown in FIG. 1A, in which the user of the first device can view files stored by the FTCS and remotely control the downloading of a selected file from the FTCS to the second device;

FIG. 2C is a block diagram of a computing system that may be used to implement one or more of the components of the computing environment shown in FIGS. 2A and 2B in accordance with some embodiments;

DETAILED DESCRIPTION

For purposes of reading the description of the various embodiments below, the following descriptions of the sections of the specification and their respective contents may be helpful:

Section A provides an introduction to example implementations of a file transfer control system (FTCS) in accordance with some embodiments of the present disclosure;

Section B describes a network environment and computing environment which may be useful for practicing embodiments described herein;

Section C embodiments of systems and methods for delivering shared resources using a cloud computing environment;

Section D describes embodiments of systems and methods for enabling file sharing over one or more networks;

Section E provides additional technical details concerning the example implementations of the FTCS introduced in Section A; and Section F describes example implementations of methods, systems/devices, and computer-readable media in accordance with the present disclosure.

A. Introduction to Illustrative Implementations of a File Transfer Control System (FTCS)

Some file sharing systems provide file synchronization capabilities that ensure that certain files maintained by the system are synchronized across multiple devices. For example, when a file is uploaded to a folder of a ShareFile® system to which multiple client devices (which may be operated by either the same user or one or more different users) have access rights, the system may automatically cause a copy of the uploaded file to be sent to such client devices for storage, thus ensuring that the uploaded file is synchronized across the various devices.

While such file synchronization capabilities can be useful, they might not meet some needs of certain users. The inventors have recognized and appreciated, for example, that circumstances may exist in which a given user may have multiple devices (e.g., a mobile device, a laptop computer, a desktop computer, etc.) simultaneously logged on to a file sharing system, and the user may want to use a first one of the devices to cause a file to be transferred between a second one of the devices and the file sharing system, other than in response to uploading a document to the system. In this disclosure, various scenarios in which such capabilities may be beneficial are introduced briefly in connection with FIGS. 1A-1E, and more details concerning the implementation of such scenarios are then provided below in connection with FIGS. 5-8.

Figure 1A:
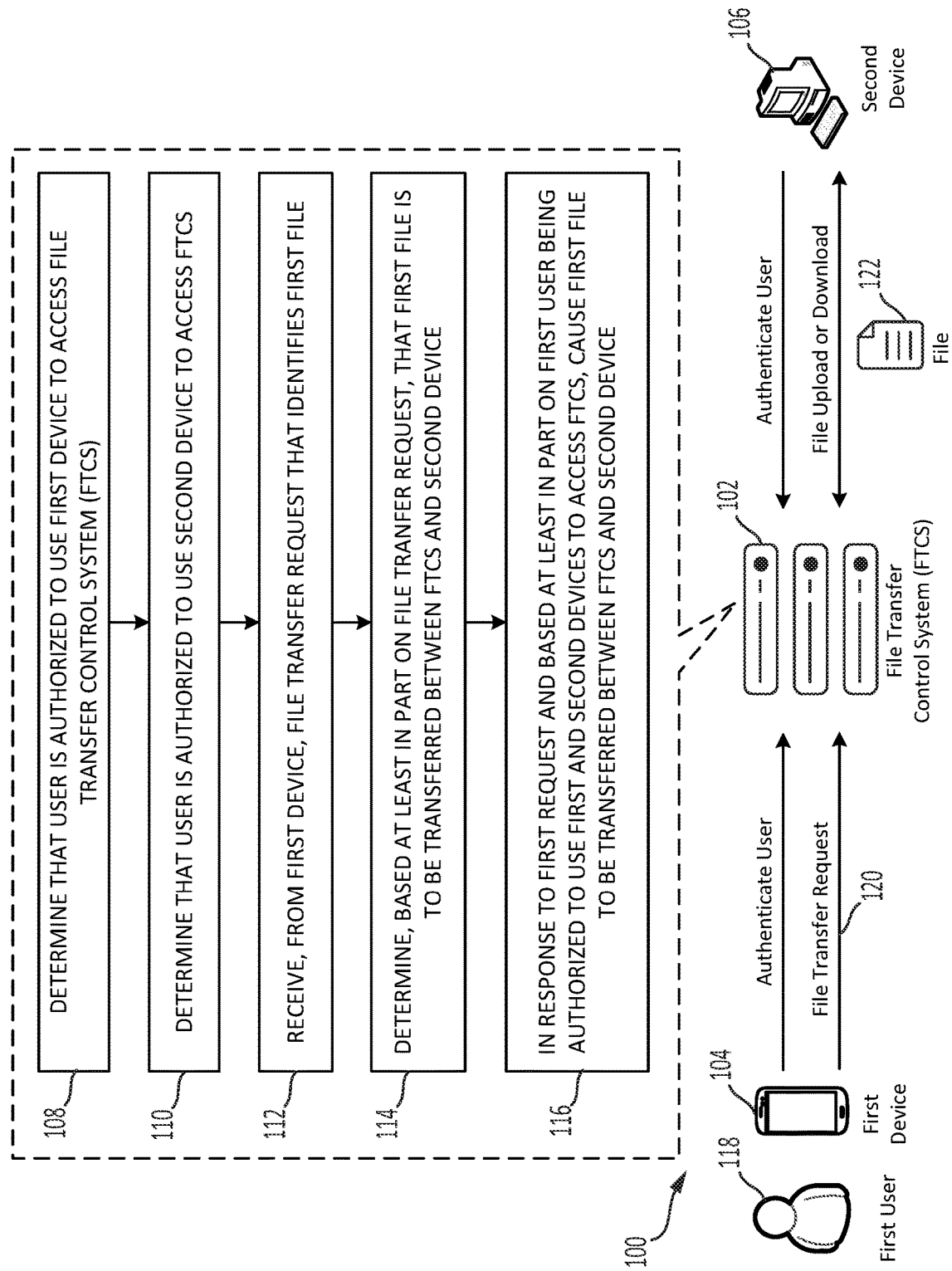
FIG. 1A is a diagram illustrating a file transfer control system (FTCS) that can be accessed by a user operating a first client device to effect the transfer of a file between a second client device and the FTCS in accordance with some embodiments of the present disclosure.
Figure 3:
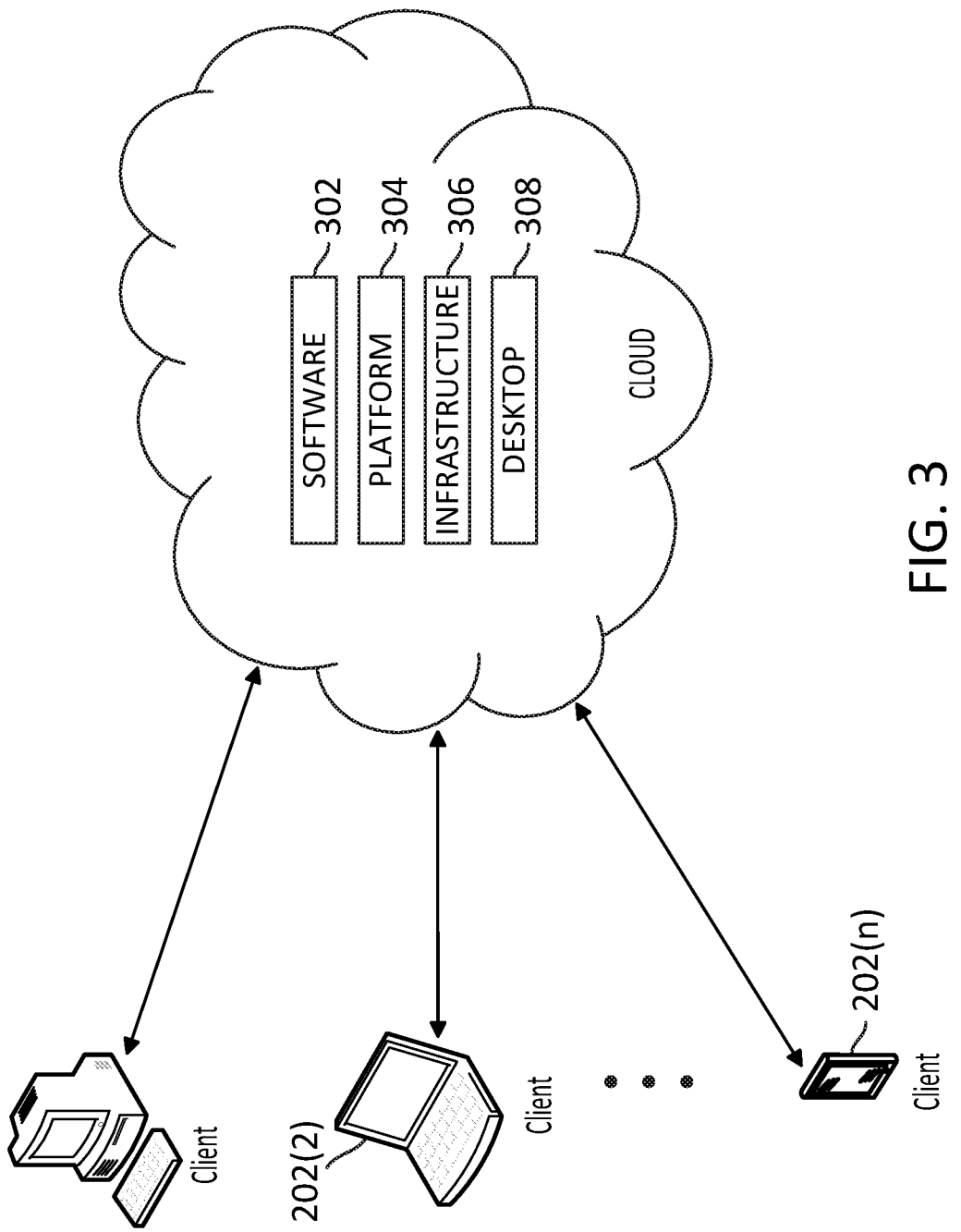
FIG. 3 is a schematic block diagram of a cloud computing environment in which various aspects of the disclosure may be implemented.

FIG. 1A illustrates an example configuration of a system 100 that may be used to implement various aspects of the present disclosure. As shown, the system 100 may include a file transfer control system (FTCS) 102, a first device 104, and a second device 106. As explained in more detail below, the first device 104 and the second device 106 may both be authenticated to the FTCS 102 by the first user 118. In some implementations, the system may further include one or more additional client devices (not shown in FIG. 1A) that may likewise be authenticated to the FTCS 102 by the same user as the first device 104 and the second device 106. Although the illustrated example shows the FTCS 102 as including just three servers, it should be appreciated that the FTCS 102 may include any number of servers (including only a single server) as well as any number of additional or different components, such as one or more databases, other network components, etc. In some embodiments, the FTCS 102 may be implemented within a cloud computing environment, such as that described below in connection with FIG. 3. Although not illustrated in FIG. 1A, it should be appreciated that the FTCS 102, the first device 104, and the second device 106 may be interconnected via a wide area network (such as the Internet), one or more local area networks, and/or one or more other network types, as described in more detail below.

As shown in FIG. 1A, the FTCS 102 may (at steps 108 and 110) determine that the first user 118 is authorized to use each of the first device 104 (step 108) and the second device 106 (step 110) to access the FTCS 102. The FTCS 102 may, for example, determine that the first user 118 has properly logged on to the FTCS 102 using each of the first device 104 and second device 106, e.g., by properly entering a username and password (or providing other access credentials, e.g., using biometric authentication) corresponding to the first user 118. As alluded to above, in some implementations, the FTCS 102 may additionally determine that the first user 118 is likewise authorized to use one or more additional client devices (not shown in FIG. 1A).

At a step 112, the FTCS 102 may receive from the first device 104 a file transfer request 120 that identifies, but does not include, a file 122 that is to be transferred either to or from the FTCS 102. At a step 114, the FTCS 102 may determine, based at least in part on the file transfer request 120, that the file 122 is to be transferred between the FTCS 102 and the second device 106, which may involve transferring the file 122 either from the FTCS 102 to the second device 106 or from the second device 106 to the FTCS 102. Finally, at a step 116, the FTCS 102 may cause the file 122 to be transferred between the FTCS 102 and the second device 106 in the determined manner.

In some embodiments, in addition to identifying the file 122, the file transfer request 120 may identify the second device 106 as either the source or the destination of the file 122. Example scenarios in which the file transfer request 120 may identify the second device 106 in such a manner are illustrated in FIGS. 1B and 1C. In particular, FIG. 1B illustrates a scenario in which the file transfer request 120 (shown in FIG. 1A) may be a file "upload" request 120a that identifies a file 122 stored on the second device 106 that is to be transferred to the FTCS 102. FIG. 1C, on the other hand, illustrates a scenario in which the file transfer request 120 (shown in FIG. 1A) may be a file "download" request

120b that identifies a file 122 stored on the FTCS 102 that is to be transferred to the second device 106.

As shown in FIG. 1B, to apprise the first user 118 of one or more files, including the file 122, that are stored on the second device 106, the FTCS 102 may receive file metadata 124 from the second device 106 that identifies such files and may forward at least some of that metadata to the first device 104 to enable the first device 104 to present information identifying such file(s) via a user interface (e.g., as a displayed list). The first user 118 may then operate the user interface of the first device 104 to select the file 122 and indicate that the file 122 is to be uploaded from the second device 106 to the FTCS 102. The file upload request 120a may thus both identify the file 122 and may specify that the file 122 is to be transferred from the second device 106 to the FTCS 102. In response to receiving the file upload request 120a, the FTCS 102 may instruct the second device 106 to send the file 122 to the FTCS 102. In some embodiments, for example, the FTCS 102 may send the second device 106 a "file upload token," as described in more detail below in connection with FIG. 4B, and instruct the second device 106 to use such a token to effect an upload of the file 122 to the FTCS 102.

Although not illustrated in FIG. 1B, one or more additional client devices (which the first user 118 has likewise authenticated to the FTCS 102, e.g., by logging on to the FTCS 102 and leaving a session running between such client devices and the FTCS 102) may similarly send file metadata to the FTCS 102 that identifies one or more files stored on such devices, and that metadata may similarly be sent to the first device 104, thus allowing the first user 118 to "view" various files stored by various ones of the user's logged on devices, and further allowing the user to select a particular file from a particular device that is to be uploaded to the FTCS 102. Further, although also not shown in FIG. 1B, it should be understood that, in some implementations, the file upload request 120a may additionally identify one or more other users with whom the uploaded file 122 is to be shared. In such implementations, the FTCS 102 may further cause the file 122 to be shared with such users after the file 122 has been uploaded to the FTCS 102. In some embodiments, for example, the FTCS 102 may send the identified users a "file download token" that can be used to effect a download of the file 122 from the FTCS 102, as described in more detail below in connection with FIG. 4B.

The scenario shown in FIG. 1B may be beneficial, for example, where the first device 104 is a smartphone or other mobile device and the second device 106 is a desktop computer at the user's workplace, and either the file 122 is not stored on the first device 104 or the bandwidth available for file transfer from the first device 104 to the FTCS 102 is limited. The first user 118 may, for example, be out of the office or traveling and unable to directly access the second device 106 to effect the desired file transfer to the FTCS 102. In such a situation, the first user 118 would be able to operate the user's mobile device to effect a transfer of the file 122 from the user's desktop computer to the FTCS 102, e.g., to share the file 122 with one or more colleagues.

Referring now to FIG. 1C, in some embodiments, in addition to sending the first device 104 data identifying one or more files that are stored on the FTCS 102 and accessible to the first user 118, e.g., by presenting a user-interface displaying the names of files that are present in one of more folders maintained by the FTCS 102, the FTCS 102 may send the first device 104 an indication of one or more other client devices that the first user 118 has also authenticated to the system, e.g., by logging on to the FTCS 102 and leaving a session running between such client devices and the FTCS 102. In such a scenario, a file download request 120b the first device sends to the FTCS 102 may both (A) identify the file 122 (which is stored by the FTCS 102) and (B) identify one or more client devices (e.g., the second device 106) to which the file 122 is to be downloaded from the FTCS 102. In response to receiving the file download request 120b, the FTCS 102 may interact with the second device 106 to cause the file 122 to be downloaded from the FTCS 102 to the second device 106. In some embodiments, for example, the FTCS 102 may send the second device 106 a "file download token," as described in more detail below in connection with FIG. 4B, and instruct the second device 106 to use such a token to effect a download of the file 122 from the FTCS 102. In other embodiments, the FTCS 102 may simply send the file 122 to the second device 106 along with instructions to store the file 122 for subsequent use.

The scenario shown in FIG. 1C may be beneficial, for example, where the first device 104 is a smartphone or other mobile device and the second device 106 is a desktop computer at the user's workplace. The first user 118 may, for example, be at home with the mobile device and realize that the first user 118 will want to access the file 122 when the first user 118 returns to the office. In such a situation, the first user 118 would be able to operate the user's mobile device to effect a transfer of the file 122 from the FTCS 102 to user's desktop computer, so that the file 122 is fully downloaded and ready to access when the first user 118 returns to the office.

In some embodiments, in response to receiving a file transfer request 120, the FTCS 102 may acquire information concerning the available bandwidth between the FTCS 102 and each client device that the first user 118 has authenticated to the FTCS 102, e.g., by logging on to the FTCS 102 and leaving a session running between such client devices and the FTCS 102. The FTCS 102 may then use that bandwidth information to select, or allow the first user 118 to select, the authenticated device from which the file 122 is to be uploaded to the FTCS 102 or to which the file 122 is to be downloaded from the FTCS 102.

Figure 1D:
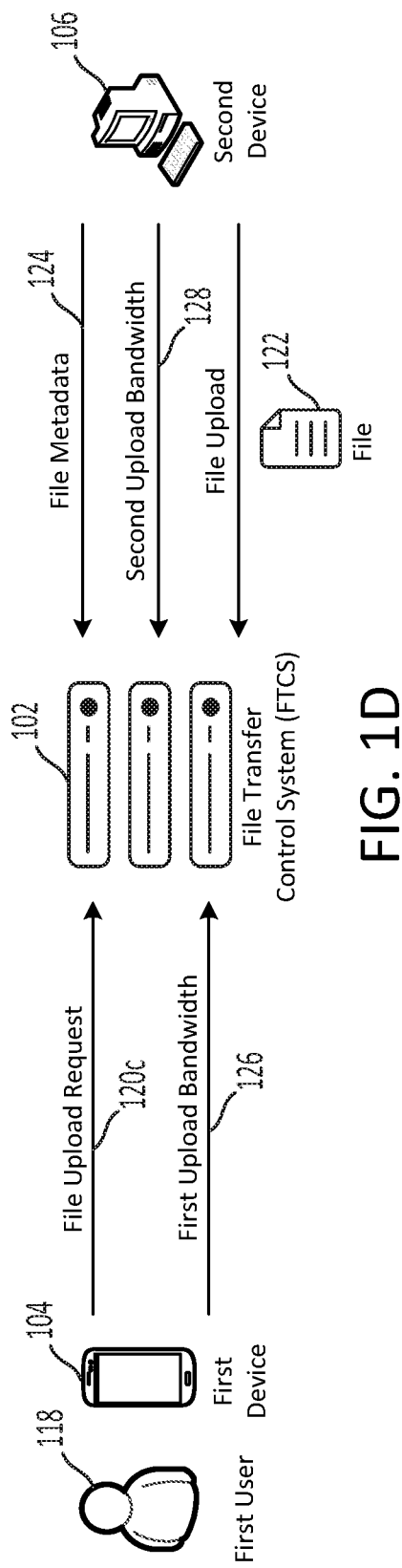
FIG. 1D illustrates a third example implementation of the FTCS shown in FIG. 1A, in which a file which is stored on both the first device and the second device can be uploaded to the FTCS from the second device, rather than from the first device, when a determination is made that the upload can be completed faster using the second device.

FIG. 1D illustrates a scenario in which a file upload request 120c may be sent from the first device 104 to the FTCS 102. In the example shown, the file upload request 120c identifies a file 122 that is to be uploaded to the FTCS 102, but does not specify the client device from which the file 122 is to be uploaded. In some implementations, for example, the file 122 may be stored on the first device 104 and the first user 118 may manipulate a user interface of the first device 104 to indicate that the file 122 is to be uploaded to the FTCS 102. In other implementations, the file 122 may not be stored on the first device 104 and may instead be identified to the first user 118 via a user interface of the first device 104 based on file metadata 124 sent from other client devices to the FTCS 102, as discussed above in connection with FIG. 1B. In either case, file metadata 124 identifying various files stored by authenticated client devices (including the second device 106) may be received by the FTCS 102.

In response to receiving the file upload request 120c, the FTCS 102 may evaluate the file metadata 124 to determine whether the file 122 is stored by the second device 106 (and/or other client devices to which the first user 118 is authenticated). After identifying the client devices on which the file 122 is stored, the FTCS 102 may determine, for each such client device, the network bandwidth that is currently available for uploading the file 122 from that device to the FTCS 102. In the example shown in FIG. 1D, the file 122 is stored on the first device 104 and that the file metadata 124 indicates that the file 122 is also stored on the second device 106. Thus, the FTCS 102 may determine a first upload bandwidth 126 for the first device 104 and a second upload bandwidth 128 for the second device 106. The available bandwidth for each device may be determined, for example, by requesting that the device send a small amount of data (e.g., 100 kilobytes) and determining how long it takes to transfer the requested data. In some embodiments, the FTCS 102 may additionally calculate, for each network connection, an estimated time for uploading the file via that connection.

After the first upload bandwidth 126 and the second upload bandwidth 128 have been determined, the FTCS 102 may determine which network connection has the greatest available bandwidth for effecting an upload of the file 122. In some embodiments, the FTCS 102 may then determine to upload the file 122 from the client device having the faster connection. As shown in FIG. 1D, in some implementations, the file 122 may be uploaded from the second device 106, rather than from the first device 104, because the second upload bandwidth 128 is greater than the first upload bandwidth 126. In response identifying a particular device (e.g., the second device 106) as the preferred upload source, the FTCS 102 may instruct that device to send the file 122 to the FTCS 102. In some embodiments, for example, the FTCS 102 may send the second device 106 a "file upload token," as described in more detail below in connection with FIG. 4B, and instruct the second device 106 to use such a token to effect an upload of the file 122 to the FTCS 102.

Although not shown in FIG. 1D, in some implementations, the FTCS 102 may additionally send to the first device 104 a request for approval of the contemplated transfer from the second device 106, prior to effecting the uploading of the file 122 from that device. In some embodiments, such request may also identify the determined bandwidths and/or estimated upload times from the various possible upload sources, thus allowing the first user 118 to make an informed decision as to whether to approve the request. In other embodiments, the FTCS 102 may cause the first device 104 to present the first user 118 (e.g., via a user interface) with a list of possible upload sources, as well as corresponding upload speeds/times, and the first user 118 may then choose a preferred upload source from that list. In some implementations, such a list may be ranked in order of highest to lowest upload speeds (or lowest to highest upload times) to facilitate the user's choice.

Further, although also not shown in FIG. 1D, it should be understood that, in some implementations, the file upload request 120*c* may additionally identify one or more other users with whom the uploaded file 122 is to be shared. In such implementations, the FTCS 102 may cause the file 122 to be shared with such users after the file 122 has been uploaded to the FTCS 102. In some embodiments, for example, the FTCS 102 may send the identified users a "file download token" that can be used to effect a download of the file 122 from the FTCS 102, as described in more detail below in connection with FIG. 4B.

The scenario shown in FIG. 1D may be beneficial, for example, where the first device 104 is a smartphone or other mobile device with a relatively low bandwidth and the second device 106 is a desktop computer at the user's workplace with a significantly higher bandwidth. Using the described technique, the first user 118 may operate the mobile phone to upload a file 122 to the FTCS 102 (e.g., to share it with a colleague) in the quickest possible way. That is, rather than uploading the file 122 to the FTCS 102 using the slower connection of the user's mobile device, the file 122 can be uploaded to the FTCS 102 using the faster connection between the user's desktop computer and the FTCS 102.

Figure 1E:
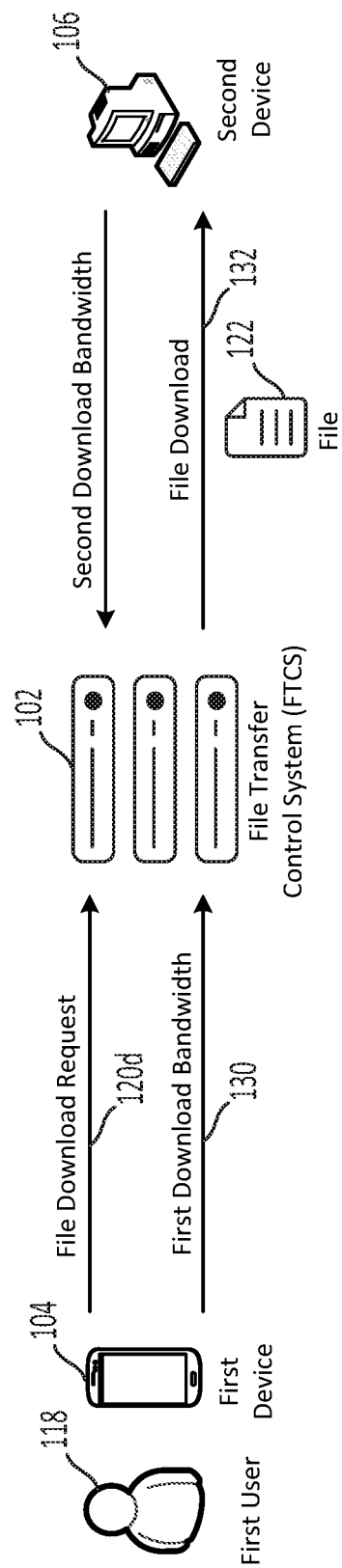
FIG. 1E illustrates a fourth example implementation of the FTCS shown in FIG. 1A, in which a user can view files stored by the FTCS and a selected file can be downloaded from the FTCS to the second device, rather than to the first device, when a determination is made that the download can be completed faster using the second device.

FIG. 1E illustrates a scenario in which a file download request 120*d* may be sent from the first device 104 to the FTCS 102. In the example shown, the file download request 120*d* identifies a file 122 that is to be downloaded from the FTCS 102, but does not specify the client device to which the file 122 is to be downloaded. The file 122 identified in the file download request 120*d* may, for example, have been selected from a list of files presented on a user-interface of the first device 104, which list includes names of files that are present in one or more folders maintained by the FTCS 102 and to which the first user 118 has access rights.

In response to receiving the file download request 120*d*, the FTCS 102 may identify any other client devices that the first user 118 has also authenticated to the system, e.g., by logging on to the FTCS 102 and leaving a session running between such client devices and the FTCS 102. After identifying the client devices to which the first user 118 has authenticated, the FTCS 102 may determine, for each such client device, the network bandwidth that is currently available for downloading the file 122 from the FTCS 102 to that device. In the example shown in FIG. 1E, the first user 118 has authenticated both the first device 104 and the second device 106 to the FTCS 102. Thus, the FTCS 102 may determine a first download bandwidth 130 for the first device 104 and a second download bandwidth 132 for the second device 106. The available bandwidth for each device may be determined, for example, sending a small amount of data (e.g., 100 kilobytes) to the device and determining how long it takes to transfer the requested data. In some embodiments, the FTCS 102 may additionally calculate, for each network connection, an estimated time for downloading the file 122 via that connection.

After the first download bandwidth 130 and the second download bandwidth 132 have been determined, the FTCS 102 may determine which network connection has the greatest available bandwidth for effecting a download of the file 122. In some embodiments, the FTCS 102 may then determine to download the file 122 to the client device having the faster connection. In the example shown in FIG. 1E, the file 122 may be downloaded to the second device 106, rather than to the first device 104, because the second download bandwidth 132 is greater than the first download bandwidth 130. In response identifying a particular device (e.g., the second device 106) as the preferred download destination, the FTCS 102 may interact with the second device 106 to cause the file 122 to be transferred from the FTCS 102 to the second device 106. In some embodiments, for example, the FTCS 102 may send the second device 106 a "file download token," as described in more detail below in connection with FIG. 4B, and instruct the second device 106 to use such a token to effect a download of the file 122 from the FTCS 102. In other embodiments, the FTCS 102 may simply send the file 122 to the second device 106 along with instructions to store the file 122 for subsequent use.

Although not shown in FIG. 1E, in some implementations, the FTCS 102 may additionally send to the first device 104 a request for approval of the contemplated transfer to the second device 106, prior to effecting the downloading of the file 122 to that device. In some embodiments, the request may also identify the determined bandwidths and/or estimated download times from the various possible download sources, thus allowing the user to make an informed decision as to whether to approve the request. In other embodiments, the FTCS 102 may cause the first device 104 to present the first user 118 (via a user interface) with a list of possible download destinations, as well as corresponding download speeds/times, and the first user 118 may then choose a preferred download destination from that list. In some implementations, such a list may be ranked in order of highest to lowest download speeds (or lowest to highest download times) to facilitate the user's choice.

The scenario shown in FIG. 1E may be beneficial, for example, where the first device 104 is a smartphone or other mobile device with a relatively low bandwidth and the second device 106 is a desktop computer at the user's workplace with a significantly higher bandwidth. Using the described technique, the desired file 122 on FTCS 102 may be downloaded to a device accessible to the first user 118 in the quickest possible way.

Additional details and example implementations of embodiments of the present disclosure are set forth below in Section E, following a description of example systems and network environments in which such embodiments may be deployed.

B. Network and Computing Environment

Figure 2A:
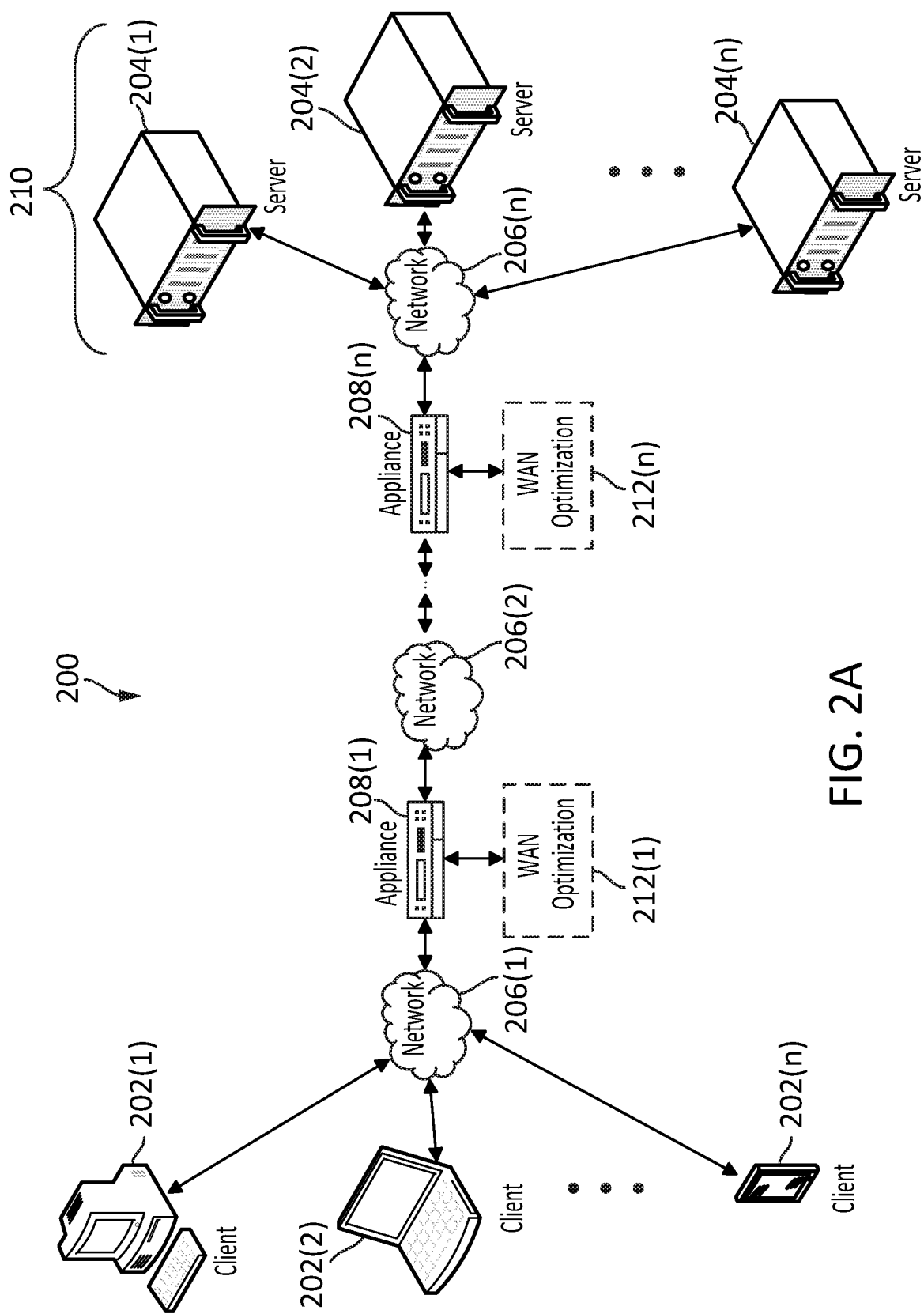
FIG. 2A is a diagram of a network computing environment in which some embodiments of the peripheral device sharing techniques disclosed herein may deployed.

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 204 may include one or more wireless local-area networks (WLANs). For short range communications within a WLAN, clients 202 may communicate using 802.11, Bluetooth, and/or Near Field Communication (NFC).

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
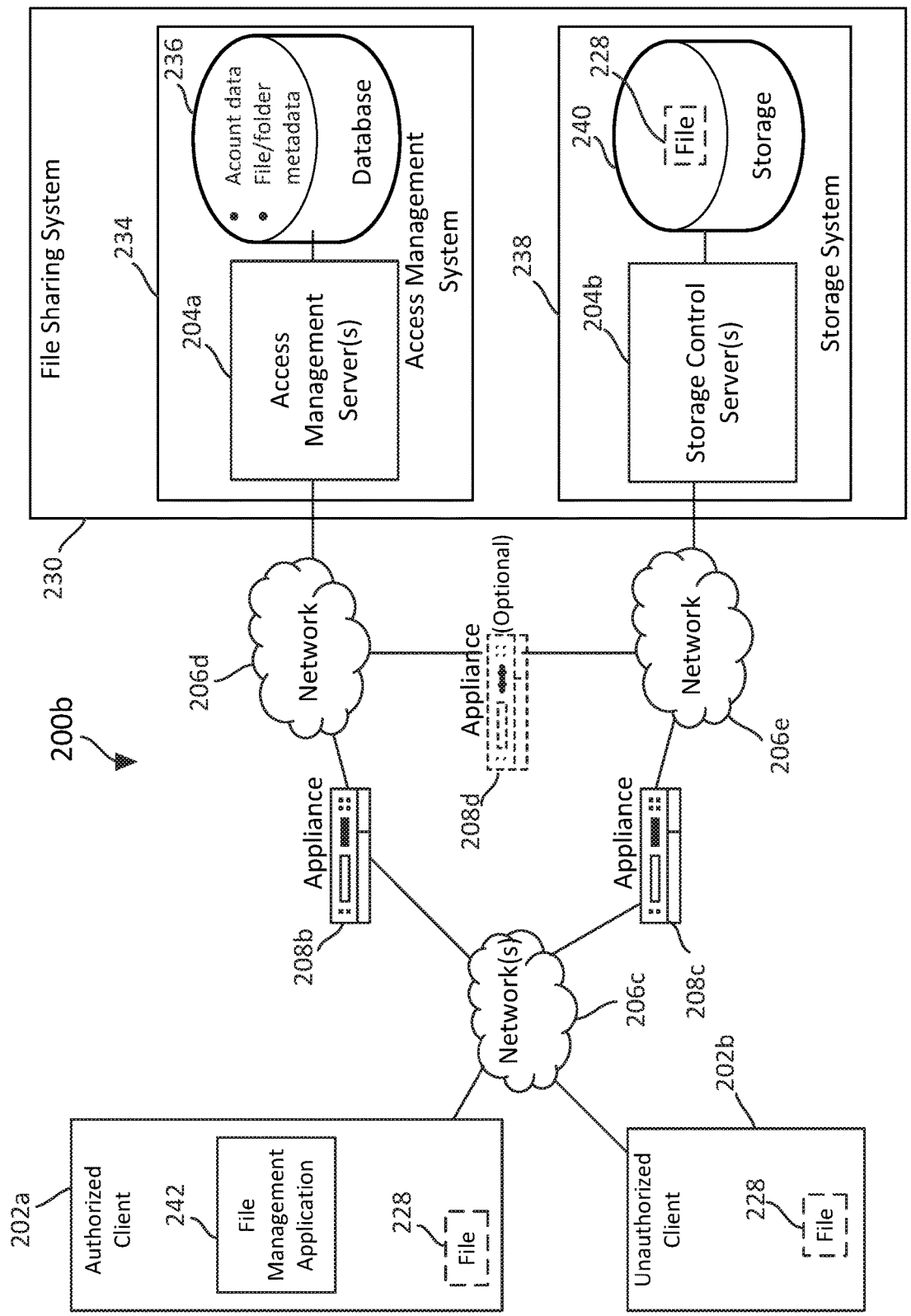
FIG. 2B is a diagram illustrating how a network computing environment like that shown in FIG. 2A may be configured to allow clients to access an example embodiment of a server-based file sharing system.

FIG. 2B shows an example network environment 200b for allowing an authorized client 202a and/or an unauthorized client 202b to upload a file 228 to a file sharing system 230 or download a file 228 from the file sharing system 230. The authorized client 202a may, for example, be a client 202 operated by a user having an active account with the file sharing system 230, while the unauthorized client 202b may be operated by a user who lacks such an account. As shown, in some embodiments, the authorized client 202a may include a file management application 242 with which a user of the authorized client 202a may access and/or manage the accessibility of one of more files 228 via the file sharing system 230. The file management application 214 may, for example, be a mobile or desktop application installed on the authorized client 202a (or in a computing environment accessible by the authorized client). The ShareFile® mobile app and the ShareFile® desktop app offered by Citrix Systems, Inc., of Fort Lauderdale, Fla., are examples of such preinstalled applications. In other embodiments, rather than being installed on the authorized client 202a, the file management application 214 may be executed by a web server (included with the file sharing system 230 or elsewhere) and provided to the authorized client 202a via one or more web pages.

As FIG. 2B illustrates, in some embodiments, the file sharing system 230 may include an access management system 234 and a storage system 238. As shown, the access management system 234 may include one or more access management servers 204a and a database 236, and the storage system 238 may include one or more storage control servers 204b and a storage medium 240. In some embodiments, the access management server(s) 204a may, for example, allow a user of the client 202a to log in to his or her account, e.g., by entering a user name and password corresponding to account data stored in the database 236. Once the user of the client 202a has logged in, the access management server 204a may enable the user to view (via the authorized client 202a) information identifying various folders represented in the storage medium 240, which is managed by the storage control server(s) 204b, as well as any files 228 contained within such folders. File/folder metadata stored in the database 236 may be used to identify the files 228 and folders in the storage medium 240 to which a particular user has been provided access rights.

In some embodiments, the clients 202a, 202b may be connected to one or more networks 206c (which may include the Internet), the access management server(s) 204a may include webservers, and an appliance 208b may load balance requests from the authorized client 202a to such webservers. The database 236 associated with the access management server(s) 204a may, for example, include information used to process user requests, such as user account data (e.g., username, password, access rights, security questions and answers, etc.), file and folder metadata (e.g., name, description, storage location, access rights, source IP address, etc.), and logs, among other things. Although the clients 202a, 202b are shown is FIG. 2B as stand-alone computers, it should be appreciated that one or both of the clients 202a, 202b shown in FIG. 2B may instead represent other types of computing devices or systems that can be operated by users. In some embodiments, for example, one or both of the authorized client 202a and the unauthorized client 202b may be implemented as a server-based virtual computing environment that can be remotely accessed using a separate computing device operated by users.

In some embodiments, the access management system 234 may be logically separated from the storage system 238, such that files 228 and other data that are transferred between clients 202 and the storage system 238 do not pass through the access management system 234. Similar to the access management server(s) 204a, one or more appliances 208b-d may load-balance requests from the clients 202a, 202b received from the network(s) 206c (which may include the Internet) to the storage control server(s) 204b. In some embodiments, the storage control server(s) 204b and/or the storage medium 240 may be hosted by a cloud-based service provider (e.g., Amazon Web Services or Microsoft Azure). In other embodiments, the storage control server(s) 204b and/or the storage medium 240 may be located at a data center managed by an enterprise of a client 202, or may be distributed among some combination of a cloud-based system and an enterprise system, or elsewhere.

After a user of the authorized client 202a has properly logged in to an access management server 204a, the server 204a may receive a request from the client 202a for access to one of the files 228 or folders to which the logged in user has access rights. The request may either be for the authorized client 202a to itself to obtain access to a file 228 or folder or to provide such access to the unauthorized client 202b. In some embodiments, in response to receiving an access request from an authorized client, the access management server 204a may communicate with the storage control server(s) 204b (e.g., either over the Internet via appliances 208b and 208c or via an appliance 208d positioned between networks 206d and 206e) to obtain a token generated by the storage control server 204b that can subsequently be used to access the identified file 228 or folder.

In some embodiments, the generated token may, for example, be sent to the authorized client 202a, and the authorized client 202a may then send a request for a file 228, including the token, to the storage control server(s) 202b. In other embodiments, the authorized client 202a may send the generated token to the unauthorized client 202b so as to allow the unauthorized client 202b to send a request for the file 228, including the token, to the storage control server(s) 202b. In yet other embodiments, an access management server 204a may, at the direction of the authorized client 202a, send the generated token directly to the unauthorized client 202b so as to allow the unauthorized client 202b to send a request for the file 228, including the token, to the storage control server(s) 202b. In any of the forgoing scenarios, the request sent to the storage control server(s) may, in some embodiments, include a uniform resource locator (URL) that resolves to an internet protocol (IP)

address of the storage control server(s) 202b, and the token may be appended to or otherwise accompany the URL. Accordingly, providing access to one or more clients 202 may be accomplished, for example, by causing the authorized client 202a to send a request to the URL address, or by sending an email, text message or other communication including the token-containing URL to the unauthorized client 202b, either directly from the access management server(s) 204a or indirectly from the access management server(s) 204a to the authorized client 202a and then from the authorized client 202a to the unauthorized client 202b. In some embodiments, selecting the URL or a user interface element corresponding to the URL, may cause a request to be sent to the storage control server(s) 204b that either causes a file 228 to be downloaded immediately to the client that sent the request, or may cause the storage control server 204b to return a webpage to the client that includes a link or other user interface element that can be selected to effect the download.

In some embodiments, a generated token can be used in a similar manner to allow either an authorized client 202a or an unauthorized client 202b to upload a file 228 to a folder corresponding to the token. In some embodiments, for example, an "upload" token can be generated as discussed above when an authorized client 202a is logged in and a designated folder is selected for uploading. Such a selection may, for example, cause a request to be sent to the access management server(s) 204a, and a webpage may be returned, along with the generated token, that permits the user to drag and drop one or more files 228 into a designated region and then select a user interface element to effect the upload. The resulting communication to the storage control server(s) 204b may include both the to-be-uploaded file(s) 228 and the pertinent token. On receipt of the communication, a storage control server 204b may cause the file(s) 228 to be stored in a folder corresponding to the token.

In some embodiments, sending a request including such a token to the storage control server(s) 204b (e.g., by selecting a URL or user-interface element included in an email inviting the user to upload one or more files 228 to the file sharing system 230), a webpage may be returned that permits the user to drag and drop one or more files 228 into a designated region and then select a user interface element to effect the upload. The resulting communication to the storage control server(s) 204b may include both the to-be-uploaded file(s) 228 and the pertinent token. On receipt of the communication, a storage control server 204b may cause the file(s) 228 to be stored in a folder corresponding to the token.

FIG. 2C illustrates an example of a computing system 246 that may be used to implement one or more of the respective components (e.g., the clients 202, the servers 204, the appliances 208, 212) within the network environment 200 shown in FIGS. 2A and 2B. As shown in FIG. 2C, the computing system 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computing system 246 may communicate via communication the bus 258. The computing system 246 as shown in FIG. 2C is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computing system 246 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

C. Systems and Methods for Delivering Shared Resources Using a Cloud Computing Environment Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 202 (such as those described above) are in communication with a cloud network 304. The cloud network 304 may include back-end platforms, e.g., servers, storage, server farms and/or data centers. The clients 202 may correspond to a single organization/tenant or multiple organizations/tenants. More particularly, in one example implementation, the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 202 or the enterprise/tenant. The servers may be located off-site in remote geographical locations or otherwise.

The cloud computing environment 300 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 202. In some embodiments, the cloud computing environment 300 may include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 302, Platform as a Service (PaaS) 304, Infrastructure as a Service (IaaS) 306, and Desktop as a Service (DaaS) 308, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

D. Systems and Methods for Providing File Sharing Over Network(s)

Figure 4A:
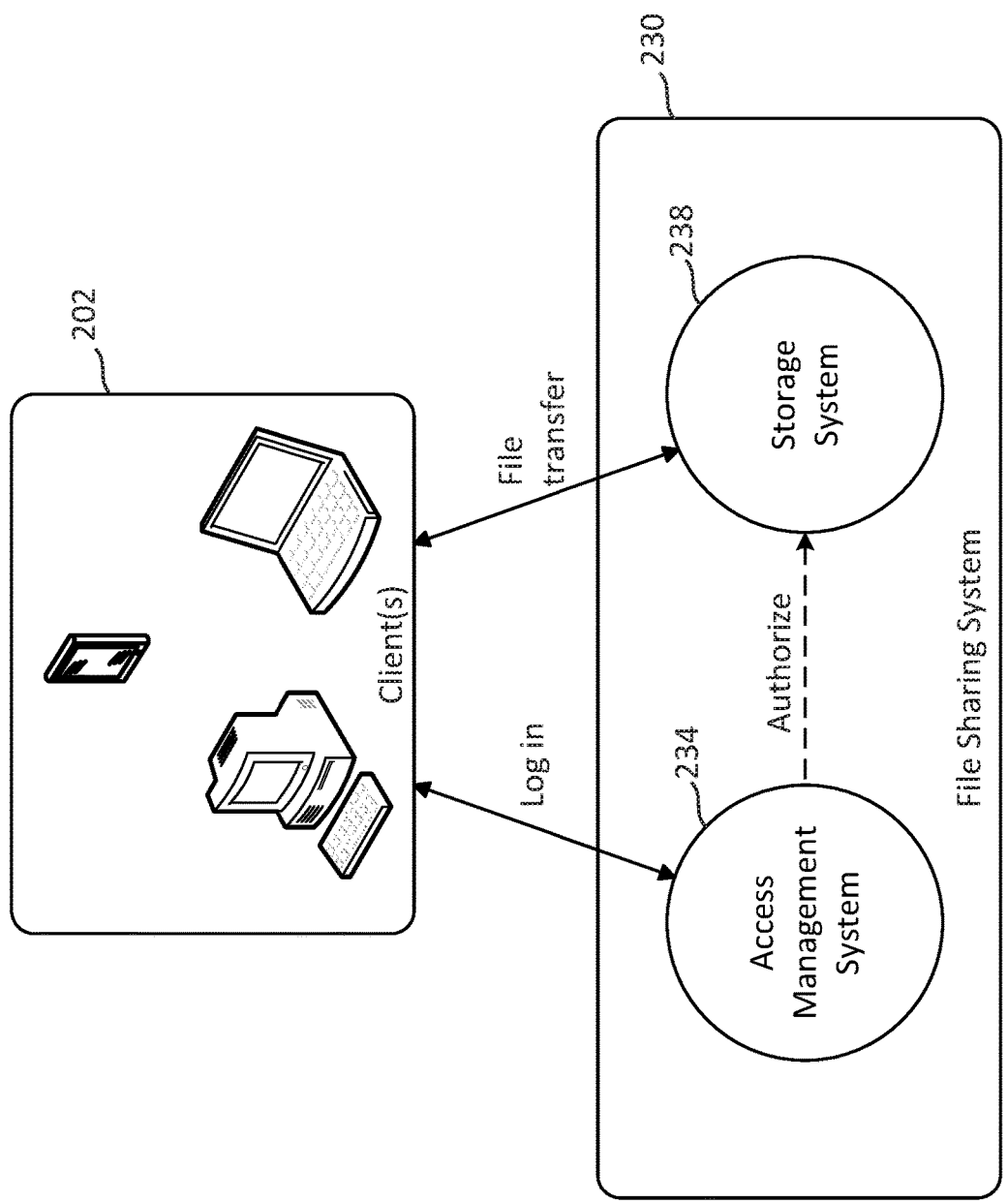
FIG. 4A is a diagram illustrating certain operations that may be performed by the file sharing system shown in FIG. 2B in accordance with some embodiments.

As discussed above in connection with FIG. 2B, in some embodiments, a file sharing system may be distributed between two sub-systems, with one subsystem (e.g., the access management system 234) being responsible for controlling access to files 228 stored in the other subsystem (e.g., the storage system 238). FIG. 4A illustrates conceptually how one or more clients 202 may interact with two such subsystems.

As shown in FIG. 4A, an authorized user operating a client 202, which may take on any of numerous forms, may log in to the access management system 234, for example, by entering a valid user name and password. In some embodiments, the access management system 234 may include one or more webservers that respond to requests from the client 202. The access management system 234 may store metadata concerning the identity and arrangements of files 228 (shown in FIG. 2B) stored by the storage system 238, such as folders maintained by the storage system 238 and any files 228 contained within such folders. In some embodiments, the metadata may also include permission metadata identifying the folders and files 228 each user is allowed to access. Once logged in, the user may employ a user-interface mechanism of the client 202 to navigate among folders for which the metadata indicates the user has access permission.

In some embodiments, the logged-in user may select a particular file 228 the user wants to access and/or to which the logged-in user wants a different user of a different client 202 to be able to access. Upon receiving such a selection from a client 202, the access management system 234 may take steps to authorize access to the selected file 228 by the logged-in client 202 and/or the different client 202. In some embodiments, for example, the access management system 234 may interact with the storage system 238 to obtain a unique "download" token which may subsequently be used by a client 202 to retrieve the identified file 228 from the storage system 238. The access management system 234 may, for example, send the download token to the logged-in client 202 and/or a client 202 operated by a different user. In some embodiments, the download token may a single-use token that expires after its first use.

In some embodiments, the storage system 238 may also include one or more webservers and may respond to requests from clients 202. In such embodiments, one or more files 228 may be transferred from the storage system 238 to a client 202 in response to a request that includes the download token. In some embodiments, for example, the download token may be appended to a URL that resolves to an IP address of the webserver(s) of the storage system 238. Access to a given file 228 may thus, for example, be enabled by a "download link" that includes the URL/token. Such a download link may, for example, be sent the logged-in client 202 in the form of a "DOWNLOAD" button or other user-interface element the user can select to effect the transfer of the file 228 from the storage system 238 to the client 202. Alternatively, the download link may be sent to a different client 202 operated by an individual with which the logged-in user desires to share the file 228. For example, in some embodiments, the access management system 234 may send an email or other message to the different client 202 that includes the download link in the form of a "DOWNLOAD" button or other user-interface element, or simply with a message indicating "Click Here to Download" or the like. In yet other embodiments, the logged-in client 202 may receive the download link from the access management system 234 and cut-and-paste or otherwise copy the download link into an email or other message the logged in user can then send to the other client 202 to enable the other client 202 to retrieve the file 228 from the storage system 238.

In some embodiments, a logged-in user may select a folder on the file sharing system to which the user wants to transfer one or more files 228 (shown in FIG. 2B) from the logged-in client 202, or to which the logged-in user wants to allow a different user of a different client 202 to transfer one or more files 228. Additionally or alternatively, the logged-in user may identify one or more different users (e.g., by entering their email addresses) the logged-in user wants to be able to access one or more files 228 currently accessible to the logged-in client 202.

Similar to the file downloading process described above, upon receiving such a selection from a client 202, the access management system 234 may take steps to authorize access to the selected folder by the logged-in client 202 and/or the different client 202. In some embodiments, for example, the access management system 234 may interact with the storage system 238 to obtain a unique "upload token" which may subsequently be used by a client 202 to transfer one or more files 228 from the client 202 to the storage system 238. The access management system 234 may, for example, send the upload token to the logged-in client 202 and/or a client 202 operated by a different user.

One or more files 228 may be transferred from a client 202 to the storage system 238 in response to a request that includes the upload token. In some embodiments, for example, the upload token may be appended to a URL that resolves to an IP address of the webserver(s) of the storage system 238. For example, in some embodiments, in response to a logged-in user selecting a folder to which the user desires to transfer one or more files 228 and/or identifying one or more intended recipients of such files 228, the access management system 234 may return a webpage requesting that the user drag-and-drop or otherwise identify the file(s) 228 the user desires to transfer to the selected folder and/or a designated recipient. The returned webpage may also include an "upload link," e.g., in the form of an "UPLOAD" button or other user-interface element that the user can select to effect the transfer of the file(s) 228 from the client 202 to the storage system 238.

In some embodiments, in response to a logged-in user selecting a folder to which the user wants to enable a different client 202 operated by a different user to transfer one or more files 228, the access management system 234 may generate an upload link that may be sent to the different client 202. For example, in some embodiments, the access management system 234 may send an email or other message to the different client 202 that includes a message indicating that the different user has been authorized to transfer one or more files 228 to the file sharing system, and inviting the user to select the upload link to effect such a transfer. Selection of the upload link by the different user may, for example, generate a request to webserver(s) in the storage system and cause a webserver to return a webpage inviting the different user to drag-and-drop or otherwise identify the file(s) 228 the different user wishes to upload to the file sharing system 230. The returned webpage may also include a user-interface element, e.g., in the form of an "UPLOAD" button, that the different user can select to effect the transfer of the file(s) 228 from the client 202 to the storage system 238. In other embodiments, the logged-in user may receive the upload link from the access management system 234 and may cut-and-paste or otherwise copy the upload link into an email or other message the logged-in user can then send to the different client 202 to enable the different client to upload one or more files 228 to the storage system 238.

In some embodiments, in response to one or more files 228 being uploaded to a folder, the storage system 238 may send a message to the access management system 234 indicating that the file(s) 228 have been successfully uploaded, and an access management system 234 may, in turn, send an email or other message to one or more users indicating the same. For user's that have accounts with the file sharing system 230, for example, a message may be sent to the account holder that includes a download link that the account holder can select to effect the transfer of the file 228 from the storage system 238 to the client 202 operated by the account holder. Alternatively, the message to the account holder may include a link to a webpage from the access management system 234 inviting the account holder to log in to retrieve the transferred files 228. Likewise, in circumstances in which a logged-in user identifies one or more intended recipients for one or more to-be-uploaded files 228 (e.g., by entering their email addresses), the access management system 234 may send a message including a download link to the designated recipients (e.g., in the manner described above), which such designated recipients can then use to effect the transfer of the file(s) 228 from the storage system 238 to the client(s) 202 operated by those designated recipients.

Figure 4B:
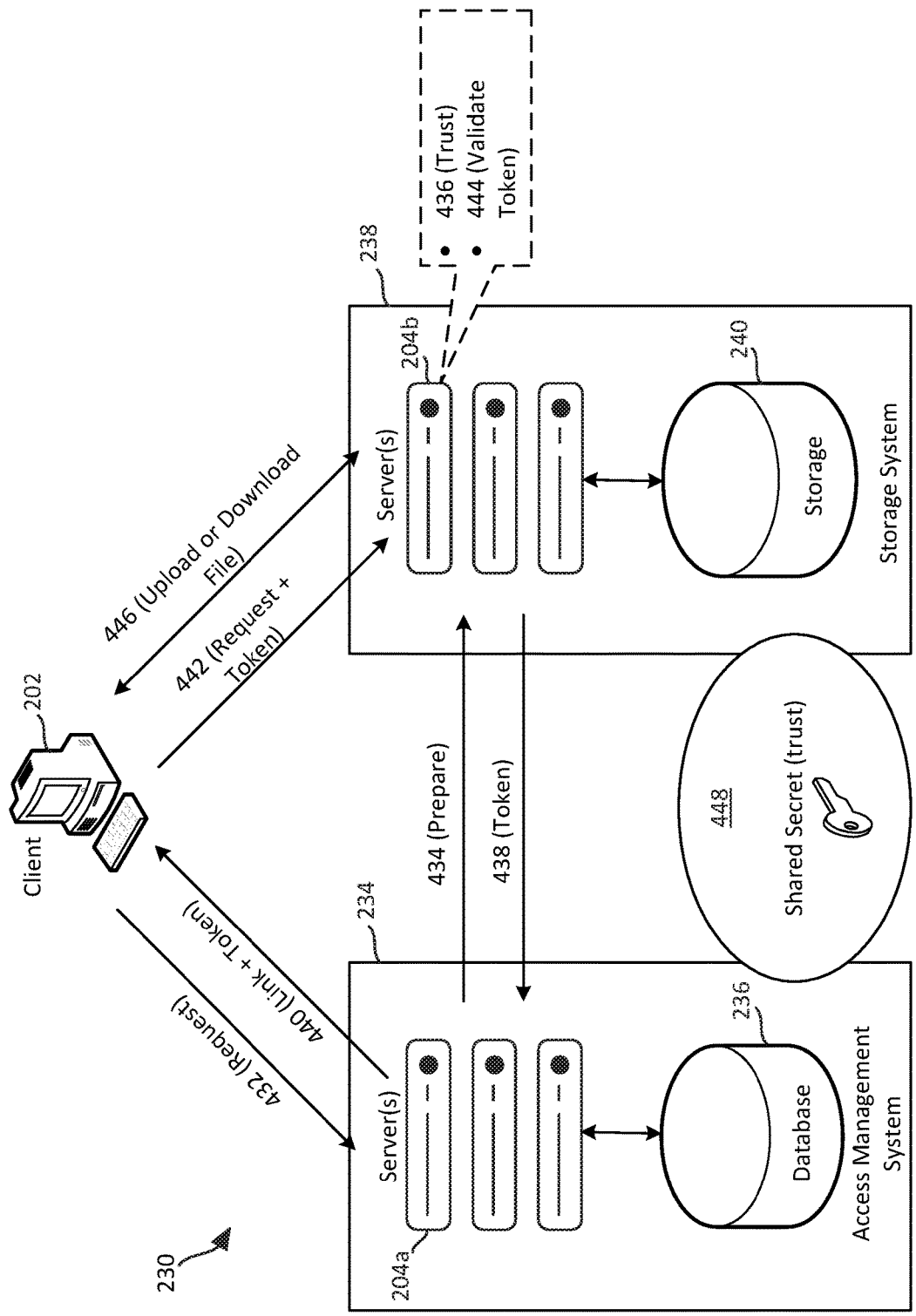
FIG. 4B is a diagram illustrating additional operations that may be performed by the file sharing system shown in FIG. 2B in accordance with some embodiments.

FIG. 4B is a block diagram showing an example of a process for generating access tokens (e.g., the upload tokens and download tokens discussed above) within the file sharing system 230 described in connection with FIGS. 2B and 4A.

As shown, in some embodiments, a logged-in client 202 may initiate the access token generation process by sending an access request 432 to the access management server(s) 204a. As noted above, the access request 432 may, for example, correspond to one or more of (A) a request to enable the downloading of one or more files 228 (shown in FIG. 2B) from the storage system 238 to the logged-in client 202, (B) a request to enable the downloading of one or more files 228 from the storage system 238 to a different client 202 operated by a different user, (C) a request to enable the uploading of one or more files 228 from a logged-in client 202 to a folder on the storage system 238, (D) a request to enable the uploading of one or more files 228 from a different client 202 operated by a different user to a folder of the storage system 238, (E) a request to enable the transfer of one or more files 228, via the storage system 238, from a logged-in client 202 to a different client 202 operated by a different user, or (F) a request to enable the transfer of one or more files 228, via the storage system 238, from a different client 202 operated by a different user to a logged-in client 202.

In response to receiving the access request 432, an access management server 204a may send a "prepare" message 434 to the storage control server(s) 204b of the storage system 238, identifying the type of action indicated in the request, as well as the identity and/or location within the storage medium 240 of any applicable folders and/or files 228. As shown, in some embodiments, a trust relationship may be established (step 436) between the storage control server(s) 204b and the access management server(s) 204a. In some embodiments, for example, the storage control server(s) 204b may establish the trust relationship by validating a hash-based message authentication code (HMAC) based on shared secret or key 448).

After the trust relationship has been established, the storage control server(s) 204b may generate and send (step 438) to the access management server(s) 204a a unique upload token and/or a unique download token, such as those as discussed above.

After the access management server(s) 204a receive a token from the storage control server(s) 204b, the access management server(s) 204a may prepare and send a link 440 including the token to one or more client(s) 202. In some embodiments, for example, the link may contain a fully qualified domain name (FQDN) of the storage control server(s) 204b, together with the token. As discussed above, the link 440 may be sent to the logged-in client 202 and/or to a different client 202 operated by a different user, depending on the operation that was indicated by the request.

The client(s) 202 that receive the token may thereafter send a request 442 (which includes the token) to the storage control server(s) 204b. In response to receiving the request, the storage control server(s) 204b may validate (step 444) the token and, if the validation is successful, the storage control server(s) 204b may interact with the client(s) 202 to effect the transfer (step 446) of the pertinent file(s) 228, as discussed above.

E. Additional Technical Details Concerning Example Embodiments of File Transfer Control System (FTCS)

Figure 5:
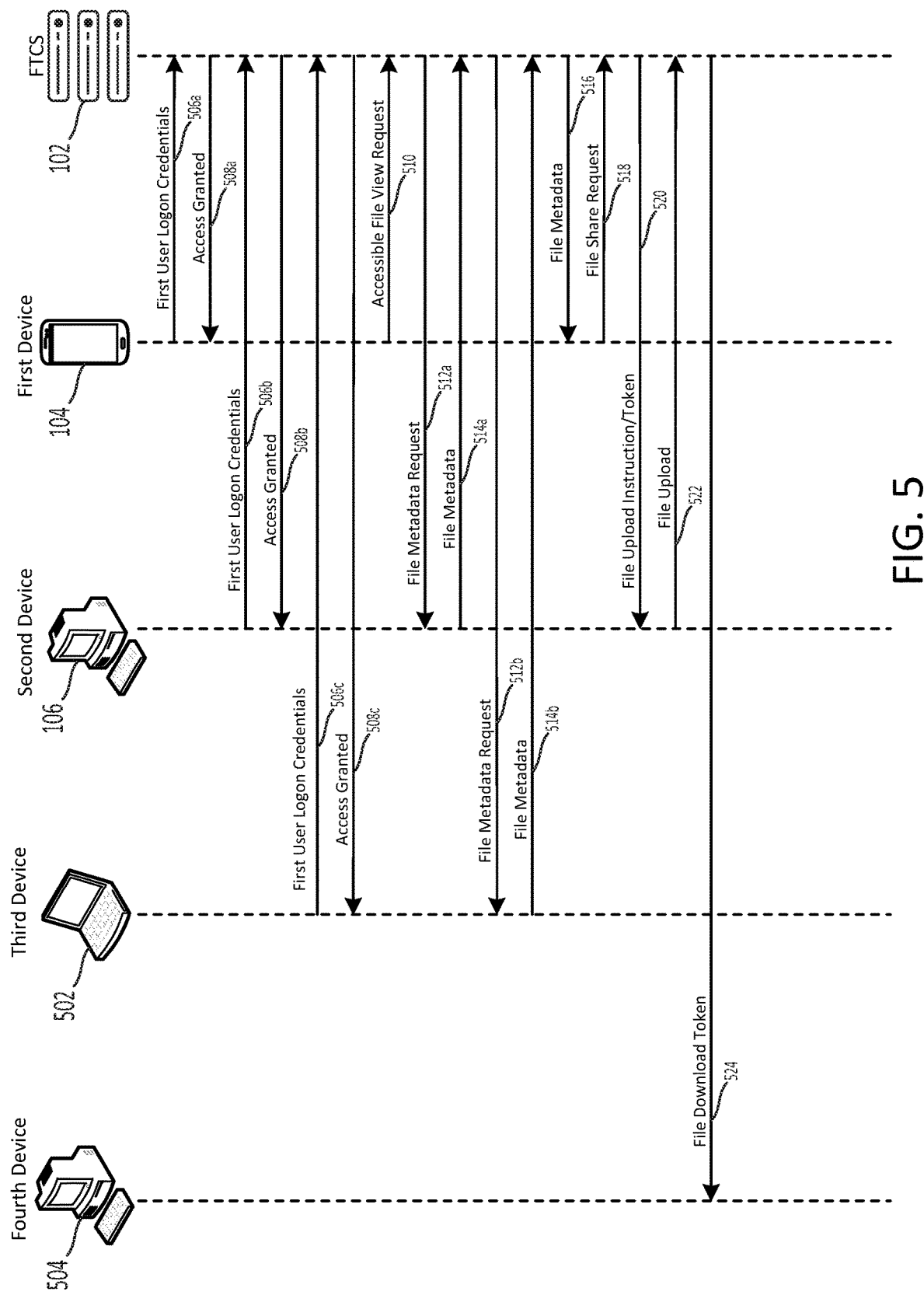
FIG. 5 is a sequence diagram illustrating messages that may be passed between the FTCS and various client devices in connection with the example implementation of the file transfer scenario introduced in connection with FIG. 1B.
Figure 6:
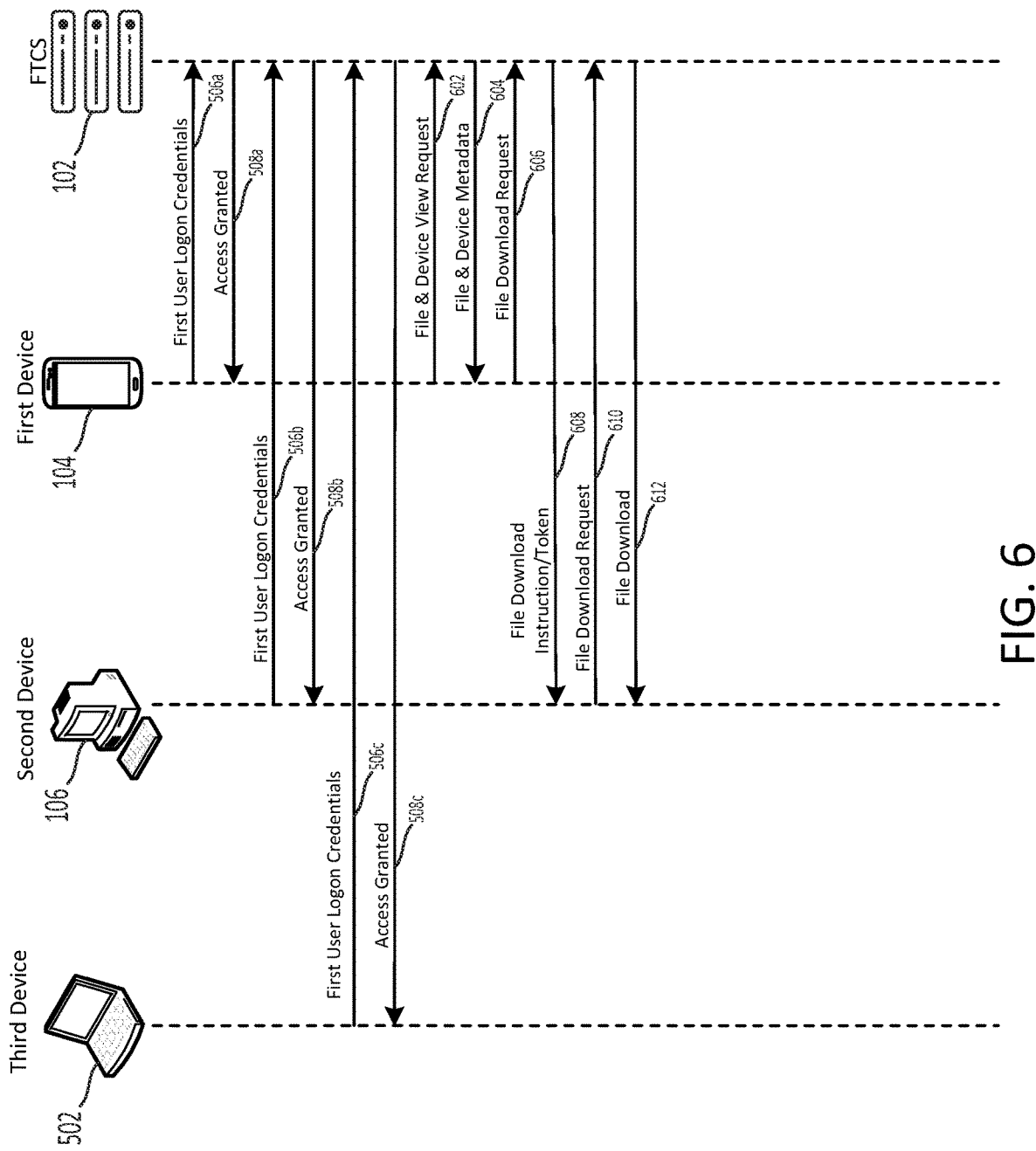
FIG. 6 is a sequence diagram illustrating messages that may be passed between the FTCS and various client devices in connection with the example implementation of the file transfer scenario introduced in connection with FIG. 1C.
Figure 7:
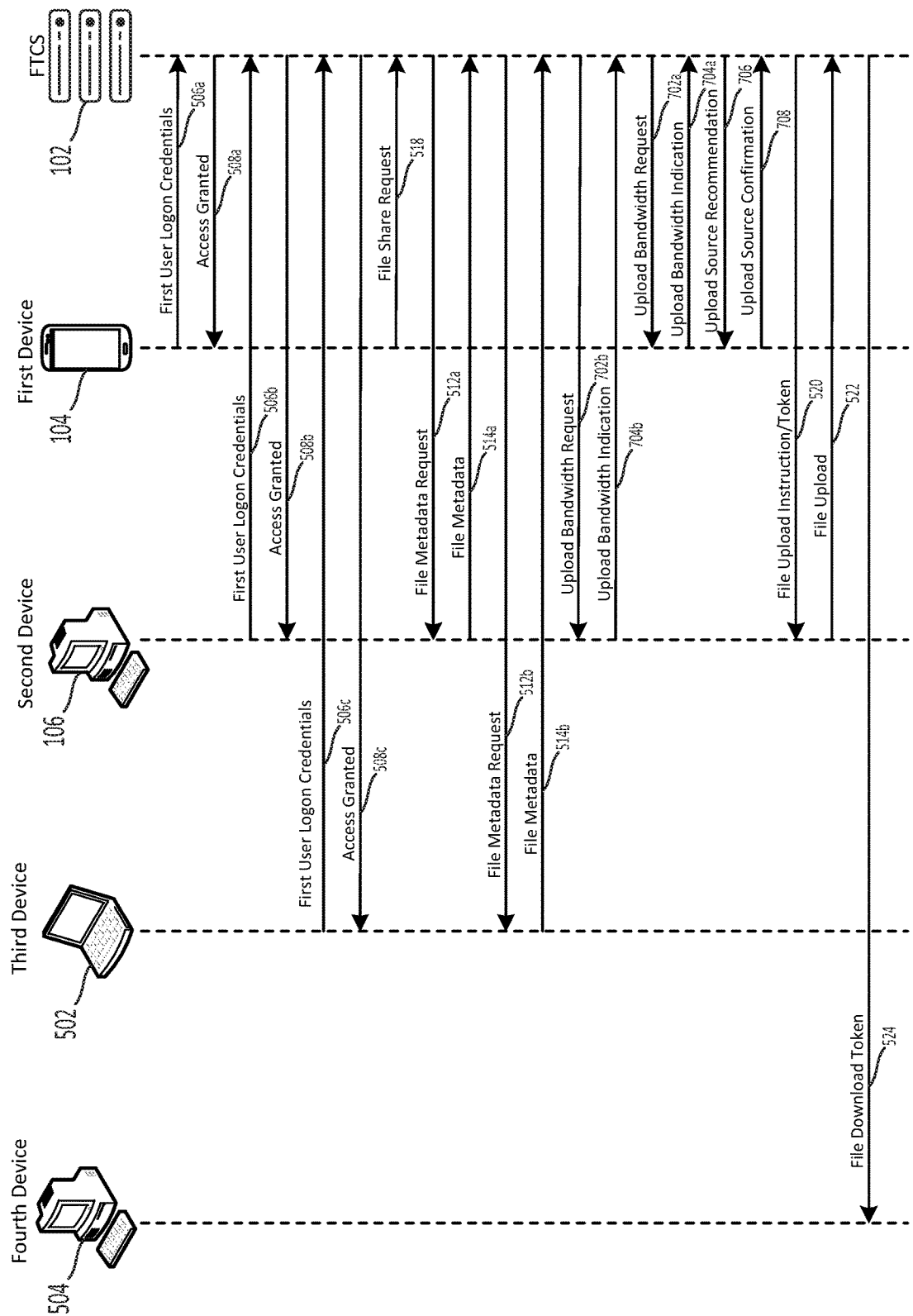
FIG. 7 is a sequence diagram illustrating messages that may be passed between the FTCS and various client devices in connection with the example implementation of the file transfer scenario introduced in connection with FIG. 1D.

FIGS. 5-8 are sequence diagrams illustrating messages that may be passed between the FTCS 102 and various client devices in connection with example implementations of the file transfer scenarios introduced above in connection with FIGS. 1B-1E, respectively. In the illustrated examples, in addition to the first device 104 and the second device 106, which are shown in FIGS. 1A-E, the systems of FIGS. 5-8 further include a third device 502. As explained below, the third device 502 may be yet another device the first user 118 may authenticate to the FTCS 102, and to or from which the FTCS 102 can potentially download or upload a file. As shown in FIGS. 5 and 7, in some implementations, the system may also include a fourth device 504. The fourth device 504 may be operated, for example, by a different user (not shown) with whom the file 122 is to be shared after the file 122 has been uploaded to the FTCS 102 from the second device 106 or the third device 502.

The FTCS 102 and the illustrated client devices 104, 106, 502, 504 may each be implemented as a computing system like that described above in connection with FIG. 2C. Each such device/system may each include one or more processors and one or more computer-readable media that, when executed by the one or more processors, cause the device/system to generate, send, receive, and process the messages illustrated in FIGS. 5-8, as well as perform the various other actions described herein.

In some embodiments, the FTCS 102 may be included within, or operate in conjunction with, a file sharing system, such as the file sharing system 230 described above in connection with FIGS. 2B, 4A, and 4B. Further, in some embodiments, the FTCS 102 and/or the file sharing system 230 in which the FTCS 102 is included, or with which the FTCS 102 is associated, may be implemented in a cloud computing environment such as that described above in connection with FIG. 3.

The sequence diagram shown in FIG. 5 may, for example, correspond to the example scenario illustrated in FIG. 1B, in which the first user 118 of the first device 102 can view files stored on the second device 106 and remotely control the uploading of a file from the second device 106 to the FTCS 102. As shown in FIG. 5, the first device 104, the second device 106, and the third device 502 may each, at different times, receive logon credentials for the FTCS 102 from the first user 118 (shown in FIGS. 1A-E). The first user 118 may, for example, operate respective user-interfaces of the first device 104, the second device 106, and the third device 502 to input a user name and password via a respective file management application 242 (shown in FIG. 2B). Such file management applications 242 may be executing, for example, either on the respective client devices or on a web server. As illustrated, in response to the inputting of such credentials, the first device 104, the second device 106, and the third device 502 may send respective messages 506a-c to the FTCS 102 to try to authenticate the first user 118 to the FTCS 102. The FTCS 102 may then evaluate the received credentials against stored authentication information associated with the first user 118 and determine whether the first user 118 has successfully authenticated to the FTCS 102. In embodiments in which the FTCS 102 is included within, or associated with, the file sharing system 230, the logon evaluation performed by the FTCS 102 may correspond to the first user 118 logging in to the access management system 234 described above in connection with FIGS. 2B, 4A, and 4B. As shown, after the FTCS 102 determines that the supplied credentials are valid, the FTCS 102 may establish respective sessions with the first device 104, the second device 106, and the third device 502 and may send corresponding messages 508*a-c* confirming the logon attempts were successful.

In some implementations, the first user 118 may (A) use the first device 104 to logon to the FTCS 102 at a first time, (B) use the second device 106 to logon to the FTCS 102 at a second time, and (C) use the third device 502 to logon to the FTCS 102 at a third time, without subsequently logging off from the FTCS 102 via any of the first device 104, the second device 106, or the third device 502. Thus, in such a circumstance, there may simultaneously exist multiple active sessions with the FTCS 102 for the first user 118, with one session existing between the first device 104 and the FTCS 102, another session existing between the second device 106 and the FTCS 102, and yet another session existing between the third device 502 and the FTCS 102. As an illustrative example, the first user 118 may use a smartphone (e.g., the first device 104) to logon to the FTCS 102 while at dinner, and may have previously left another session with the FTCS 102 running overnight on the user's desktop computer (e.g., the second device 106) at work, and may have also left yet another session with the FTCS 102 running on the user's laptop computer (e.g., the third device 502) at home.

Once authenticated to the FTCS 102, the first user 118 may operate a user interface of any of the first device 104, the second device 106, or the third device 502 to request to view the files that are stored by the user's other devices. In some embodiments, for example, each of the first device 104, the second device 106, and the third device may have a specified storage area in which files accessible to the FTCS 102 are to be stored. For instance, each such client device may have a folder, or a set of folders, that are designated as being accessible to the FTCS 102.

As shown if FIG. 5, the first device 104 may send a message 510 to the FTCS 102 requesting to view a list of the files that are stored in the designated storage area(s), e.g., folder(s), of the user's other client devices. In response to receiving the message 510, the FTCS 102 may send messages 512*a-b* to the other logged on devices 106, 502 requesting metadata describing any files stored in the designated storage areas of those devices. As shown, in response to the messages 512*a-b*, the devices may determine whether any files exist in their designated storage area(s), and may return corresponding messages 514*a-b* including metadata describing any such files. The FTCS 102 may then send a message 516 to the first device 104 that includes at least some of the file metadata that was included in the messages 514*a-b*. The first device 104 may also determine whether any files are stored in its designated storage area and determine metadata describing any such files. The first device 104 may thus obtain file metadata describing all of the files that are stored in the designated storage area(s) of each of the first device 104, the second device 106, and the third device 502. Table 1 below shows an illustrative example of file metadata that may be determined by the first device 104 using the foregoing technique.

TABLE 1

| Device Name | File Name | Hash |
| --- | --- | --- |
| First User's Desktop | 1. Agreement.doc | 1. 1231B12A21C21 |
| | 2. Introduction.doc | 2. 817712ABE1234 |
| | 3. Safety Requirements.pdf | 3. 878a7BEFDA122 |
| First User's Laptop | 1. Agreement.doc | 1. 1231B12A21C21 |
| | 2. Safety Requirements.pdf | 2. 878a7BEFDA122 |
| First User's Mobile | 1. Agreement.doc | 1. 1231B12A21C21 |
| | 2. Safety Requirements.pdf | 2. 878a7BEFDA122 |

In particular, the metadata in the first row of Table 1 may correspond to the file metadata in the message 514*a*, the metadata in the second row of Table 1 may correspond to the file metadata in the message 514*b*, and the metadata in the third row or Table 1 may correspond to the file metadata for the files stored on the first device 104. As shown, in some implementations, in addition to specifying the names of files that are stored by the various devices, the file metadata may include a hash value for each file that is calculated based on that file's contents. In some embodiments, such hash values may be used, for example, to determine whether two files with the same name have identical contents.

After the file metadata shown in Table 1 has been determined by the first device 104, the first device 104 may present a user interface that indicates, e.g., by displaying lists within one or more folders or otherwise, all of the files that are stored in the designated storage areas of the first device 104, the second device 106, and the third device 502. The user interface of the first device 104 may further enable the first user 118 to select one of the indicated files, e.g., the file 122 shown in FIG. 1B, and instruct the FTCS 102 either to share the selected file with another user, e.g., a user of the fourth device 504, or to simply upload the selected file to the FTCS 102. FIG. 5 illustrates the former scenario, i.e., where the first user 118 has operated the user interface of the first device 104 to request that a particular file that is stored on a particular device, e.g., the file 122, be shared with another user. In response to such a selection by the first user 118, the first device 104 may send a message 518 to the FTCS 102 indicating that the selected file is to be shared with a particular individual. For example, in addition to identifying the file 112 and the client device on which the file 122 is stored, the message 518 may include an email address or phone number of the individual with whom the file is to be shared.

As shown in FIG. 5, in response to receiving the message 518, the FTCS 102 may, in some embodiments, generate a "file upload token," e.g., as described above in connection with FIG. 4B, and send that token to the device on which the selected file, e.g., the file 122, is stored. In the illustrated example, the FTCS 102 may send to the second device 106 a message 520 that includes both a file upload token and an instruction for the second device 106 to use that token to upload the selected file, e.g., the file 122, to the FTCS 102.

Upon receiving the message 520, the second device 106 may identify the indicated file, e.g., the file 122, and send to the FTCS 102 one or more messages 522 to upload that file to the FTCS 102. After the file has been successfully uploaded, the FTCS 102 may generate a "file download token," e.g., as described above in connection with FIG. 4B, to enable the specified user to download the indicated file, and may send that token to the specified recipient, e.g., by sending an email or short message service (SMS) (i.e., "text") message including the token to the indicated email address or phone number for the recipient. The message 524 shown in FIG. 5 may correspond, for example, to an email or text message (including the "file download token") that was sent to the designated recipient. The designated recipient may then operate the fourth device 504 to open the received email or text message (or otherwise access the message 524) and use the "file download token" to download the specified file from the FTCS 102, e.g., as described above in connection with FIG. 4B. In some embodiments, for example, the message 524 may include a uniform resource locator (URL) that resolves to an internet protocol (IP) address of a storage control server 202b (shown in FIGS. 2B and 4B) to which the specified file was uploaded from the second device 106, and the token may be appended to or otherwise accompany the URL.

The sequence diagram shown in FIG. 6 may correspond, for example, to the example scenario illustrated in FIG. 1C, in which the first user 118 of the first device 104 can view files stored by the FTCS 102 and remotely control the downloading of a selected file from the FTCS 102 to the second device 106. The manner in which the messages 506a-c and 508a-c may be generated and processed to authenticate the first user 118 to the FTCS 102 for each of the first device 102, the second device 104, and the third device 502, was described in detail above in connection with FIG. 5, and will thus not be repeated here. For purposes of the illustrated example, it may be assumed that, following transmission of the messages 508a-c, the first user 118 is simultaneously logged on to the FTCS 102 from each of the first device 104, the second device 106, and the third device 506.

Once authenticated to the FTCS 102, the first user 118 may operate a user interface of any of the first device 104, the second device 106, or the third device 502 to request to view the files stored by the FTCS 102 that are accessible by the first user 118, as well as the identity of any other devices the first user 118 has authenticated to the FTCS 102. For example, as shown if FIG. 6, the first device 104 may send one or more messages 602 to the FTCS 102 requesting to view a list of the files stored by the FTCS 102 to which the first user 118 has access privileges, as well as the identity of any other devices the first user 118 has authenticated to the FTCS 102. In response to receiving the message(s) 602, the FTCS 102 may send one or more messages 604 back to the first device 104 including metadata corresponding to the requested information.

Tables 2 and 3 below show illustrative examples of file metadata and device metadata, respectively, that may be returned to the first device 104 via the message(s) 604 in the depicted scenario.

TABLE 2

Accessible Files

Agreement.doc
Introduction.doc
Safety Requirements.pdf

TABLE 3

Available Devices

First User's Desktop
First User's Laptop
First User's Mobile

Upon receiving the file and device metadata from the FTCS 102, the first device 104 may present a user interface that identifies the files stored by the FTCS 102 to which the first user 118 has access rights as well as any other of the user's devices that are currently available, e.g., authenticated to the FTCS 102 by the first user 118. The user interface of the first device 104 may further enable the first user 118 to select one of the indicated files, e.g., the file 122 shown in FIG. 1C, and may also enable the first user 118 to select one of the available devices to which the selected file is to be downloaded.

In response to the user making such selections, the first device 104 may send a message 606 to the FTCS 102 indicating that the selected file is to be downloaded to the indicated device. As shown in FIG. 6, in response to receiving the message 606, the FTCS 102 may, in some embodiments, generate a "file download token," e.g., as described above in connection with FIG. 4B, and send that token to the selected device to which the file is to be downloaded. In the illustrated example, the FTCS 102 sends to the second device 106 a message 608 that includes both a file download token and an instruction for the second device 106 to use that token to download the selected file, e.g., the file 122, from the FTCS 102.

Upon receiving the message 608, the second device 106 may use the "file download token" to download the specified file from the FTCS 102, e.g., as described above in connection with FIG. 4B. In some embodiments, for example, the second device 106 may send a message 610 to the FTCS 102 to request that the file be downloaded. In some implementations, for example, the message 610 may include a uniform resource locator (URL) that resolves to an internet protocol (IP) address of a storage control server 202b (shown in FIGS. 2B and 4B) capable of accessing the indicated file, and the token may be appended to or otherwise accompany the URL.

Upon receiving the message 610 requesting the file download, the FTCS 102 may use the token to identify and retrieve the desired file and may send the specified file to the second device 106 via one or more messages 612.

In some embodiments, upon receiving the message 606, the FTCS 102 may simply retrieve the specified file, e.g., the file 122, from storage and send that file to the indicated device, e.g., the second device 106, rather than generating and sending a file download token to enable the indicated file download operation.

The sequence diagram shown in FIG. 7 may correspond, for example, to the example scenario illustrated in FIG. 1D, in which a file which is stored on both the first device 104 and the second device 106 can be uploaded to the FTCS 102 from the second device 106, rather than from the first device 104, when a determination is made that the upload can be completed faster using the second device 106. The manner in which the messages 506a-c and 508a-c may be generated and processed to authenticate the first user 118 to the FTCS 102 for each of the first device 102, the second device 104, and the third device 502, was described in detail above in connection with FIG. 5, and will thus not be repeated here. For purposes of the illustrated example, it may be assumed that, following transmission of the messages 508a-c, the first user 118 is simultaneously logged on to the FTCS 102 from each of the first device 104, the second device 106, and the third device 502.

In some embodiments, after the first user 118 has logged on to the FTCS 102 using the first device 104, a user interface of the first device 104 may present the first user 118 with a list of files that are stored on the first device 104. In some implementations, the same user interface may additionally or alternatively present the first user 118 with one or more lists of files that are stored on the second device 106 and/or the third device 502. List of files stored on the second device 106 and the third device 502 may be derived, for example, from file metadata that the first device 104 receives (via the FTCS 102) from those devices, e.g., as described above in connection with messages 512a-b, 514a-b, and 516 shown in FIG. 5.

The first user 118 may then operate the user interface of the first device 104 to select one of the indicated files, e.g., the file 122 shown in FIG. 1D, and instruct the FTCS 102 either to share the selected file with another user, e.g., a user of the fourth device 504, or to simply upload the selected file to the FTCS 102. FIG. 7 illustrates the former scenario, i.e., where the first user 118 has operated the user interface of the first device 104 to request that a particular file that is stored on the first device 104 be shared with another user. In response to such a selection by the first user 118, the first device 104 may send a message 518 (also described above in connection with FIG. 5) to the FTCS 102 indicating that the selected file is to be shared with a particular individual. For example, in addition to identifying the file 122, the message 518 may include an email address or phone number of the individual with whom the file is to be shared. In some implementations, the message 518 may include metadata for the selected file similar to that shown in Table 1 above, e.g., including both a file name and a hash value based on the file contents, for reasons explained below.

As discussed above in connection with FIG. 5, in some embodiments, each of the first device 104, the second device 106, and the third device may have a specified storage area in which files accessible to the FTCS 102 are to be stored. For instance, each such client device may have a folder, or a set of folders, that are designated as being accessible to the FTCS 102. As shown in FIG. 7, in response to receiving the message 518, the FTCS 102 may send messages 512a-b to the other logged on devices 106, 502 requesting metadata describing any files stored in the designated storage areas of those devices, and may receive corresponding messages 514a-b including metadata describing any such files from those devices. The process for obtaining such metadata from the other logged on clients 106, 502 is described in more detail above in connection with FIG. 5. As a result, the FTCS 102 may acquire file metadata similar to that shown in Table 1 above from the other logged on client devices 106, 502. These steps would, of course, not be necessary in circumstances where the FTCS 102 has already received the pertinent metadata from the other logged on devices 106, 502, e.g., if they were performed prior to the first device sending the message 518.

After receiving the file metadata from the other logged on client devices 106, 502, the FTCS 102 may determine whether the file identified in the message 518 is also stored on any of the other logged on client devices 106, 502. Such a determination may be made, for example, by comparing file metadata included in the message 518 with the file metadata included in the messages 514a-b. In some implementations, hash values based on the files' contents may be used for such a comparison, in addition to or in lieu of file names, to minimize the risk that two different files (or different versions of the same file) with the same name will be flagged as matching.

If, based on such a comparison, a copy of the same file is determined to exist on any of the other logged on client devices 106, 502, then the FTCS 102 may send messages to such devices to determine the bandwidth available between each such device and the FTCS 102 for uploading the selected file, e.g., the file 122, to the FTCS 102. In addition, if the file also exists on the first device 104, the FTCS 102 may likewise send a message to the first device 104 to ascertain the bandwidth available between the first device 104 and the FTCS 102 for uploading the selected file, e.g., the file 122, to the FTCS 102. As shown in FIG. 7, the FTCS 102 may determine, for example, that the file identified in the message 518 exists on both the first device 104 and the second device 106, and may thus send messages 702a and 702b to the first device 104 and the second device 106, respectively, and may receive corresponding messages 704a and 704b from those devices that identify such devices' available bandwidth for uploading the identified file.

Thus, the FTCS 102 may determine a first upload bandwidth (indicated in the message 704a) for the first device 104 and a second upload bandwidth (indicated in the message 704b) for the second device 106. The available bandwidth for each device may be determined, for example, by requesting that the device send a small amount of data (e.g., 100 kilobytes) and determining how long it takes to transfer the requested data. In some embodiments, the FTCS 102 may additionally calculate, for each network connection, an estimated time for uploading the file via that connection.

After the available upload bandwidths for the first device 104 and the second device 106 have been determined, the FTCS 102 may determine which network connection has the greatest available bandwidth for effecting an upload of the selected file, e.g., the file 122. In the example shown in FIG. 7, the FTCS 102 may determine that the second device 106 has more available bandwidth than the first device 104 for uploading the selected file and, based on that determination, may send to the first device 104 a message 706 recommending that the file be uploaded from the second device 106. In some embodiments, the message 706 may also identify the determined bandwidths and/or estimated upload times from the various possible upload sources, thus allowing the first user 118 to make an informed decision as to whether to approve the recommendation.

Upon receiving the message 706, the user interface of the first device may provide the first user 118 the ability to confirm that the selected file should be transferred from the recommended source. In response to the first user 118 indicating (via the user interface of the first device 104) that the file should be transferred from the recommended source, the first device 104 may send a message 708 to the FTCS 102 confirming that the file transfer is to proceed as proposed.

Upon receiving the message 708, the FTCS 102 may effect uploading of the selected file (via messages 520 and 522) from the second device 106 to the FTCS 102, and enabling the downloading of the uploaded file (via message 524) from the FTCS 102 to the fourth device 504 (operated by the user with whom the file is to be shared), as described above in connection with FIG. 5.

Figure 8:
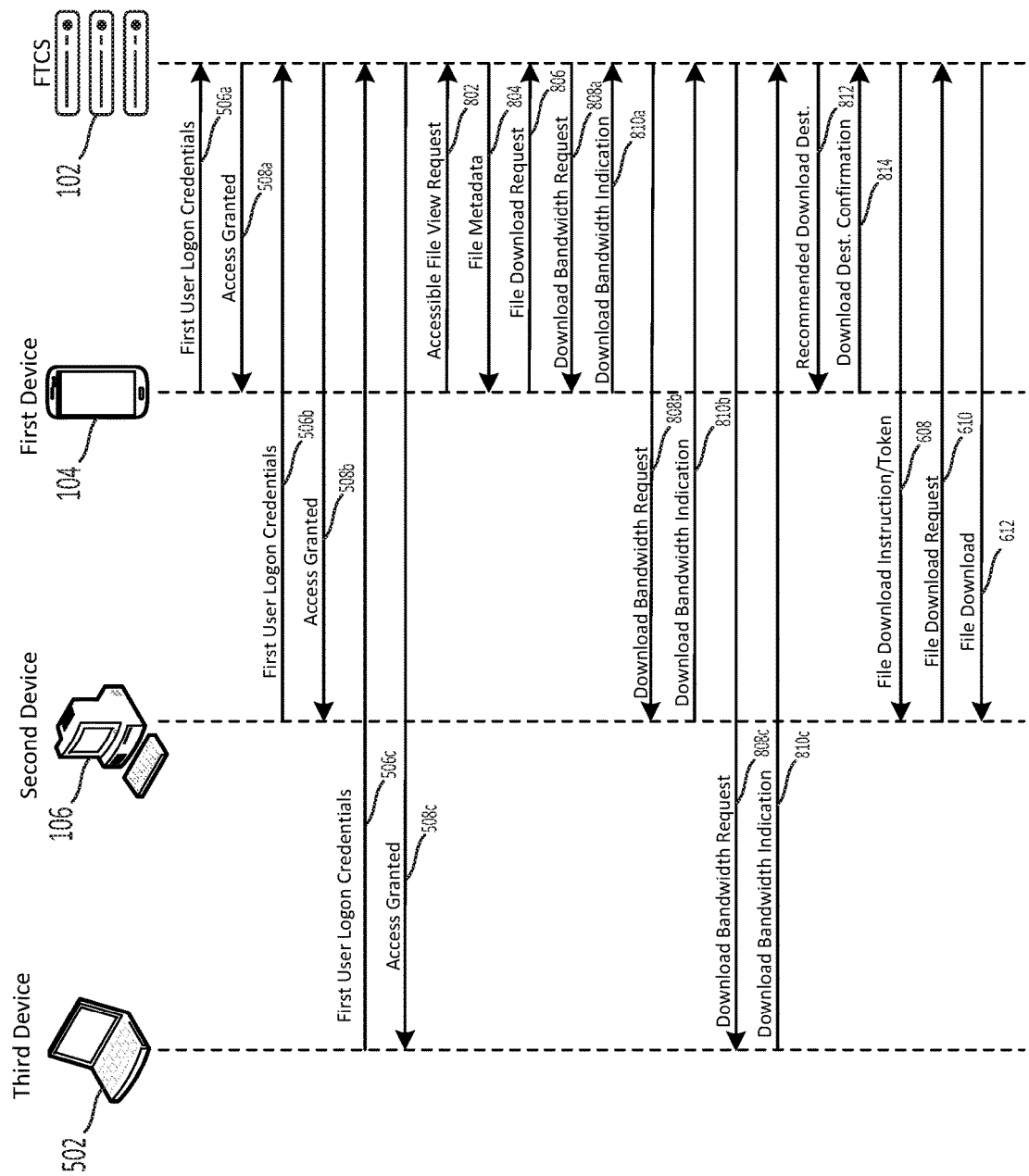
FIG. 8 is a sequence diagram illustrating messages that may be passed between the FTCS and various client devices in connection with the example implementation of the file transfer scenario introduced in connection with FIG. 1E.

The sequence diagram shown in FIG. 8 may correspond, for example, to the example scenario illustrated in FIG. 1E, in which a user can view files stored by the FTCS 102 and a selected file can be downloaded from the FTCS 102 to the second device 106, rather than to the first device 104, when a determination is made that the download can be completed faster using the second device 106. The manner in which the messages 506a-c and 508a-c may be generated and processed to authenticate the first user 118 to the FTCS 102 for each of the first device 102, the second device 104, and the third device 502, was described in detail above in connection with FIG. 5, and will thus not be repeated here. For purposes of the illustrated example, it may be assumed that, following transmission of the messages 508a-c, the first user 118 is simultaneously logged on to the FTCS 102 from each of the first device 104, the second device 106, and the third device 506.

Once authenticated to the FTCS 102, the first user 118 may operate a user interface of any of the first device 104, the second device 106, or the third device 502 to request to view the files stored by the FTCS 102 that are accessible by the first user 118. For example, as shown if FIG. 8, the first device 104 may send a message 802 to the FTCS 102 requesting to view a list of the files stored by the FTCS 102 to which the first user 118 has access privileges. In response to receiving the message 802, the FTCS 102 may send a message 804 back to the first device 104 including metadata describing the accessible files. An example of file metadata that may be returned to the first device 104 via the message 804 is shown in Table 2 above.

Upon receiving the file metadata from the FTCS 102, the first device 104 may present a user interface that identifies the files stored by the FTCS 102 to which the first user 118 has access rights and enable the first user 118 to select one of the indicated files, e.g., the file 122 shown in FIG. 1E, to be downloaded from the FTCS 102 to one of the user's logged on devices 104, 106, 502.

In response to the first user 118 selecting one of the identified files for downloading from the FTCS 102, the first device 104 may send a message 806 to the FTCS 102 requesting that the selected file be downloaded from the FTCS 102 to one of the user's logged on devices 104, 106, 502. Upon receiving the message 806, the FTCS 102 may send messages 808*a-c* to the first device 104 as well as the others of the user's logged on devices 106, 502 to determine the bandwidth available between each such device and the FTCS 102 for downloading the selected file, e.g., the file 122, from the FTCS 102 to that device. As shown in FIG. 8, because the first user 118 has authenticated to the FTCS 102 from each of the first device 104, the second device 106, and the third device 502, the FTCS 102 may send messages 808*a*, 808*b*, and 808*c* to the first device 104, the second device 106, and the third device 502, respectively, and may receive corresponding messages 810*a*, 810*b*, and 810*c* from those devices that identify the available bandwidths for downloading the identified file to those devices.

Thus, the FTCS 102 may determine a first download bandwidth (indicated in the message 810*a*) for the first device 104, a second download bandwidth (indicated in the message 810*b*) for the second device 106, and a third download bandwidth (indicated in the message 810*c*) for the third device 502. The available bandwidth for each device may be determined, for example, by sending a small amount of data (e.g., 100 kilobytes) to that device and determining how long it takes to transfer the requested data. In some embodiments, the FTCS 102 may additionally calculate, for each network connection, an estimated time for downloading the file via that connection.

After the available download bandwidths for the first device 104, the second device 106, and the third device 502 have been determined, the FTCS 102 may determine which network connection has the greatest available bandwidth for effecting a download of the selected file, e.g., the file 122, from the FTCS 102. In the example shown in FIG. 8, the FTCS 102 may determine that the second device 106 has more available bandwidth than the first device 104 for downloading the selected file and, based on that determination, may send to the first device 104 a message 812 recommending that the file be downloaded to the second device 106. In some embodiments, the message 812 may also identify the determined bandwidths and/or estimated download times to the various possible download destinations, thus allowing the first user 118 to make an informed decision as to whether to approve the recommendation.

Upon receiving the message 812, the user interface of the first device 104 may provide the first user 118 the ability to confirm that the selected file should be transferred from the FTCS 102 to the recommended download destination, e.g., the second device 106. In response to the first user 118 indicating (via the user interface of the first device 104) that the file should be transferred to the recommended destination, the first device 104 may send a message 814 to the FTCS 102 confirming that the file transfer is to proceed as proposed.

Upon receiving the message 814, the FTCS 104 may effect downloading of the selected file (e.g., via messages 608, 610, 612) from the FTCS 102 to the second device 106 as described above in connection with FIG. 6. In some embodiments, upon receiving the message 814, the FTCS 102 may simply retrieve the specified file, e.g., the file 122, from storage and send that file to the indicated device, e.g., the second device 106, rather than generating and sending a file download token to enable the indicated file download operation.

F. Example Implementations of Methods, Systems, and Computer-Readable Media in Accordance with the Present Disclosure The following paragraphs (M1) through (M12) describe examples of methods that may be implemented in accordance with the present disclosure.

(M1) A computing system may perform a method that involves determining that a first user is authorized to use a first device to access the computing system, determining that the first user is authorized to use a second device to access the computing system, and receiving, from the first device, a file transfer request that identifies a first file. The computing system may further determine, based at least in part on the file transfer request, that the first file is to be transferred between the computing system and the second device. In response to the file transfer request and based at least in part on the first user being authorized to use each of the first and second devices to access the computing system, the computing system may cause the first file to be transferred between the computing system and the second device.

(M2) A computing system may perform the method described in paragraph (M1), and that further involves determining, based at least in part on the file transfer request, that the first file is to be transferred from the second device to the computing system, and causing the first file to be transferred from the second device to the computing system.

(M2) A computing system may perform the method described in paragraph (M2) or (M2), and that further involves receiving, from the second device, metadata describing a plurality of files stored by the second device and including first data identifying the first file, and determining that the file transfer request includes the first data.

(M3) A computing system may perform the method described in paragraph (M2), and that further involves sending the metadata to the first device.

(M4) A computing system may perform the method described in any of paragraphs (M1) through (M3), and that further involves determining that the file transfer request identifies a recipient with whom the first file is to be shared, and causing the first file to be transferred from the computing system to a recipient device operated by the recipient.

(M5) A computing system may perform the method described in any of paragraphs (M1) though (M4), and that further involves determining that the first file is to be transferred from the computing system to the second device, and causing the first file to be transferred from the computing system to the second device.

(M6) A computing system may perform the method described in paragraph (M5), and that further involves determining that the file transfer request indicates that the first file is to be transferred from the computing system to the second device.

(M7) A computing system may perform the method described in any of paragraphs (M1) though (M6), and that further involves determining that a first bandwidth of a first communication channel between the second device and the computing system is greater than a second bandwidth of a second communication channel between the first device and the computing system, and determining, based at least in part on the first bandwidth being greater than the second bandwidth, that the first file is to be transferred between the computing system and the second device.

(M8) A computing system may perform the method described in paragraph (M7), and that further involves determining that the first user is authorized to use a third device to access the computing system, and determining that the first bandwidth is greater than a third bandwidth of a third communication channel between the third device and the computing system; wherein determining that the first file is to be transferred between the computing system and the second device is further based at least in part on the first bandwidth being greater than the third bandwidth.

(M9) A computing system may perform the method described in any of paragraphs (M1) through (M8), and that further involves sending, to the first device, a request for a confirmation by the first user that the first file is to be transferred between the computing system and the second device, and receiving, from the first device, the confirmation; wherein determining that the first file is to be transferred between the computing system and the second device is further based at least in part on receipt of the confirmation.

(M10) A computing system may perform a method that involves determining that a first user is authorized to use a first device to access the computing system, determining that the first user is authorized to use a second device to access the computing system, and receiving, from the first device, a file transfer request that identifies a first file. The computing system may further determine that a first bandwidth of a first communication channel between the second device and the computing system is greater than a second bandwidth of a second communication channel between the first device and the computing system, and determine, based at least in part on the first bandwidth being greater than the second bandwidth, that the first file is to be transferred between the computing system and the second device. In response to the file transfer request and based at least in part on the first user being authorized to use each of the first and second devices to access the computing system, the computing system may cause the first file to be transferred between the computing system and the second device.

(M11) A computing system may perform the method described in paragraph (M10), and that further involves sending, to the first device, a request for a confirmation by the first user that the first file is to be transferred between the computing system and the second device, and receiving, from the first device, the confirmation; wherein determining that the first file is to be transferred between the computing system and the second device is further based at least in part on receipt of the confirmation.

(M12) A computing system may perform the method described in paragraph (M10) or paragraph (M11), and that further involves determining that the first user is authorized to use a third device to access the computing system, and determining that the first bandwidth is greater than a third bandwidth of a third communication channel between the third device and the computing system; wherein determining that the first file is to be transferred between the computing system and the second device is further based at least in part on the first bandwidth being greater than the third bandwidth.

The following paragraphs (S1) through (S13) describe examples of systems and devices that may be implemented in accordance with the present disclosure.

(S1) A computing system may comprise at least one processor, and at least one computer-readable medium. The at least one computer-readable medium may be encoded with instructions which, when executed by the at least one processor, cause the computing system to determine that a first user is authorized to use a first device to access the computing system, to determine that the first user is authorized to use a second device to access the computing system, to receive, from the first device, a file transfer request that identifies a first file, to determine, based at least in part on the file transfer request, that the first file is to be transferred between the computing system and the second device, and, based at least in part on the first user being authorized to use each of the first and second devices to access the computing system, to cause the first file to be transferred between the computing system and the second device in response to the file transfer request.

(S2) A computing system may be configured as described in paragraph (S1), and the at least one computer-readable medium may be further encoded with additional instruction which, when executed by the at least one processor, further cause the computing system to determine, based at least in part on the file transfer request, that the first file is to be transferred from the second device to the computing system, and to cause the first file to be transferred from the second device to the computing system.

(S3) A computing system may be configured as described in paragraph (S1) or paragraph (S2), and the at least one computer-readable medium may be further encoded with additional instruction which, when executed by the at least one processor, further cause the computing system to receive, from the second device, metadata describing a plurality of files stored by the second device and including first data identifying the first file, and to determine that the file transfer request includes the first data.

(S4) A computing system may be configured as described in paragraph (S3), and the at least one computer-readable medium may be further encoded with additional instruction which, when executed by the at least one processor, further cause the computing system to send the metadata to the first device.

(S5) A computing system may be configured as described in any of paragraphs (S1) through (S4), and the at least one computer-readable medium may be further encoded with additional instruction which, when executed by the at least one processor, further cause the computing system to determine that the file transfer request identifies a recipient with whom the first file is to be shared, and to cause the first file to be transferred from the computing system to a recipient device operated by the recipient.

(S6) A computing system may be configured as described in any of paragraphs (S1) through (S5), and the at least one computer-readable medium may be further encoded with additional instruction which, when executed by the at least one processor, further cause the computing system to determine that the first file is to be transferred from the computing system to the second device, and to cause the first file to be transferred from the computing system to the second device.

(S7) A computing system may be configured as described in paragraph (S6), and the at least one computer-readable medium may be further encoded with additional instruction which, when executed by the at least one processor, further cause the computing system to determine that the file transfer request indicates that the first file is to be transferred from the computing system to the second device.

(S8) A computing system may be configured as described in any of paragraphs (S1) through (S7), and the at least one computer-readable medium may be further encoded with additional instruction which, when executed by the at least one processor, further cause the computing system to determine that a first bandwidth of a first communication channel between the second device and the computing system is greater than a second bandwidth of a second communication channel between the first device and the computing system, and to determine that the first file is to be transferred between the computing system and the second device further based at least in part on the first bandwidth being greater than the second bandwidth.

(S9) A computing system may be configured as described in paragraph (S8), and the at least one computer-readable medium may be further encoded with additional instruction which, when executed by the at least one processor, further cause the computing system to determine that the first user is authorized to use a third device to access the computing system, to determine that the first bandwidth is greater than a third bandwidth of a third communication channel between the third device and the computing system, and to determine that the first file is to be transferred between the computing system and the second device further based at least in part on the first bandwidth being greater than the third bandwidth.

(S10) A computing system may be configured as described in any of paragraphs (S1) through (S9), and the at least one computer-readable medium may be further encoded with additional instruction which, when executed by the at least one processor, further cause the computing system to send, to the first device, a request for a confirmation by the first user that the first file is to be transferred between the computing system and the second device, to receive, from the first device, the confirmation, and to determine that the first file is to be transferred between the computing system and the second device further based at least in part on receipt of the confirmation.

(S11) A computing system may comprise at least one processor and at least one computer-readable medium. The at least one computer-readable medium may be encoded with instructions which, when executed by the at least one processor, cause the computing system to determine that a first user is authorized to use a first device to access the computing system, to determine that the first user is authorized to use a second device to access the computing system, to receive, from the first device, a file transfer request that identifies a first file, to determine that a first bandwidth of a first communication channel between the second device and the computing system is greater than a second bandwidth of a second communication channel between the first device and the computing system, to determine, based at least in part on the first bandwidth being greater than the second bandwidth, that the first file is to be transferred between the computing system and the second device, and, based at least in part on the first user being authorized to use each of the first and second devices to access the computing system, to cause the first file to be transferred between the computing system and the second device in response to the file transfer request.

(S12) A computing system may be configured as described in paragraph (S11), and the at least one computer-readable medium may be further encoded with additional instruction which, when executed by the at least one processor, further cause the computing system to determine that the first user is authorized to use a third device to access the computing system, to determine that the first bandwidth is greater than a third bandwidth of a third communication channel between the third device and the computing system, and to determine that the first file is to be transferred between the computing system and the second device further based at least in part on the first bandwidth being greater than the third bandwidth.

(S13) A computing system may be configured as described in paragraph (S11) or paragraph (S12), and the at least one computer-readable medium may be further encoded with additional instruction which, when executed by the at least one processor, further cause the computing system to send, to the first device, a request for a confirmation by the first user that the first file is to be transferred between the computing system and the second device, to receive, from the first device, the confirmation, and to determine that the first file is to be transferred between the computing system and the second device further based at least in part on receipt of the confirmation.

The following paragraphs (CRM1) through (CRM13) describe examples of computer-readable media that may be implemented in accordance with the present disclosure.

(CRM1) At least one non-transitory, computer-readable medium may be encoded with instructions which, when executed by at least one processor included in a computing system, cause the computing system to determine that a first user is authorized to use a first device to access the computing system, to determine that the first user is authorized to use a second device to access the computing system, to receive, from the first device, a file transfer request that identifies a first file, to determine, based at least in part on the file transfer request, that the first file is to be transferred between the computing system and the second device, and, based at least in part on the first user being authorized to use each of the first and second devices to access the computing system, to cause the first file to be transferred between the computing system and the second device in response to the file transfer request.

(CRM2) At least one computer-readable medium may be configured as described in paragraph (CRM1), and may be further encoded with additional instruction which, when executed by the at least one processor, further cause the computing system to determine, based at least in part on the file transfer request, that the first file is to be transferred from the second device to the computing system, and to cause the first file to be transferred from the second device to the computing system.

(CRM3) At least one computer-readable medium may be configured as described in paragraph (CRM1) or paragraph (CRM2), and may be further encoded with additional instruction which, when executed by the at least one processor, further cause the computing system to receive, from the second device, metadata describing a plurality of files stored by the second device and including first data identifying the first file, and to determine that the file transfer request includes the first data.

(CRM4) At least one computer-readable medium may be configured as described in paragraph (CRM3), and may be further encoded with additional instruction which, when executed by the at least one processor, further cause the computing system to send the metadata to the first device.

(CRM5) At least one computer-readable medium may be configured as described in any of paragraphs (CRM1) through (CRM4), and may be further encoded with additional instruction which, when executed by the at least one processor, further cause the computing system to determine that the file transfer request identifies a recipient with whom the first file is to be shared, and to cause the first file to be transferred from the computing system to a recipient device operated by the recipient.

(CRM6) At least one computer-readable medium may be configured as described in any of paragraphs (CRM1) through (CRM5), and may be further encoded with additional instruction which, when executed by the at least one processor, further cause the computing system to determine that the first file is to be transferred from the computing system to the second device, and to cause the first file to be transferred from the computing system to the second device.

(CRM7) At least one computer-readable medium may be configured as described in paragraph (CRM6), and may be further encoded with additional instruction which, when executed by the at least one processor, further cause the computing system to determine that the file transfer request indicates that the first file is to be transferred from the computing system to the second device.

(CRM8) At least one computer-readable medium may be configured as described in any of paragraphs (CRM1) through (CRM7), and may be further encoded with additional instruction which, when executed by the at least one processor, further cause the computing system to determine that a first bandwidth of a first communication channel between the second device and the computing system is greater than a second bandwidth of a second communication channel between the first device and the computing system, and to determine that the first file is to be transferred between the computing system and the second device further based at least in part on the first bandwidth being greater than the second bandwidth.

(CRM9) At least one computer-readable medium may be configured as described in paragraph (CRM8), and may be further encoded with additional instruction which, when executed by the at least one processor, further cause the computing system to determine that the first user is authorized to use a third device to access the computing system, to determine that the first bandwidth is greater than a third bandwidth of a third communication channel between the third device and the computing system, and to determine that the first file is to be transferred between the computing system and the second device further based at least in part on the first bandwidth being greater than the third bandwidth.

(CRM10) At least one computer-readable medium may be configured as described in any of paragraphs (CRM1) through (CRM9), and may be further encoded with additional instruction which, when executed by the at least one processor, further cause the computing system to send, to the first device, a request for a confirmation by the first user that the first file is to be transferred between the computing system and the second device, to receive, from the first device, the confirmation, and to determine that the first file is to be transferred between the computing system and the second device further based at least in part on receipt of the confirmation.

(CRM11) At least one computer-readable medium may be encoded with instructions which, when executed by the at least one processor included in a computing system, cause the computing system to determine that a first user is authorized to use a first device to access the computing system, to determine that the first user is authorized to use a second device to access the computing system, to receive, from the first device, a file transfer request that identifies a first file, to determine that a first bandwidth of a first communication channel between the second device and the computing system is greater than a second bandwidth of a second communication channel between the first device and the computing system, to determine, based at least in part on the first bandwidth being greater than the second bandwidth, that the first file is to be transferred between the computing system and the second device, and, based at least in part on the first user being authorized to use each of the first and second devices to access the computing system, to cause the first file to be transferred between the computing system and the second device in response to the file transfer request.

(CRM12) At least one computer-readable medium may be configured as described in paragraph (CRM11), and may be further encoded with additional instruction which, when executed by the at least one processor, further cause the computing system to determine that the first user is authorized to use a third device to access the computing system, to determine that the first bandwidth is greater than a third bandwidth of a third communication channel between the third device and the computing system, and to determine that the first file is to be transferred between the computing system and the second device further based at least in part on the first bandwidth being greater than the third bandwidth.

(CRM13) At least one computer-readable medium may be configured as described in paragraph (CRM11) or paragraph (CRM12), and may be further encoded with additional instruction which, when executed by the at least one processor, further cause the computing system to send, to the first device, a request for a confirmation by the first user that the first file is to be transferred between the computing system and the second device, to receive, from the first device, the confirmation, and to determine that the first file is to be transferred between the computing system and the second device further based at least in part on receipt of the confirmation.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
    receiving, by a computing system and over a network, first logon credentials input by a user to a first device;
    determining, by the computing system, that the first logon credentials match stored authentication credentials for an account of the user;
    establishing a first session between the computing system and a first application associated with the first device based at least in part on the first logon credentials matching the stored authentication credentials, the first session enabling the first device to be operated to access one or more files associated with the account, wherein the one or more files are stored in a storage medium associated with the computing system;
    receiving, by the computing system and over the network, second logon credentials input by the user to a second device, the second device being different than the first device;
    determining, by the computing system, that the second logon credentials match the stored authentication credentials;
    establishing a second session between the computing system and a second application associated with the second device based at least in part on the second logon credentials matching the stored authentication credentials, the second session enabling the second device to be operated to access the one or more files associated with the account;
    determining, while the first session is active, that the second session is also active;
    based at least in part on the second session being active while the first session is active, causing the first device to display an indication that a first file is available to be transferred between the computing system and the second device;
    receiving, by the computing system from the first device, a file transfer request that identifies the first file;
    determining, by the computing system, that the first file is to be transferred between the computing system and the second device; and
    causing the first file to be transferred between the computing system and the second device.

2. The method of claim 1, wherein:
    determining that the first file is to be transferred between the computing system and the second device comprises determining that the first file is to be transferred from the second device to the computing system; and
    causing the first file to be transferred between the computing system and the second device comprises causing the first file to be transferred from the second device to the computing system.

3. The method of claim 2, further comprising:
    receiving, by the computing system and from the second device, metadata describing a plurality of files stored by the second device and including first data identifying the first file; and
    determining that the file transfer request includes the first data.

4. The method of claim 3, further comprising:
    sending the metadata to the first device.

5. The method of claim 2, further comprising:
    determining that the file transfer request identifies a recipient with whom the first file is to be shared; and
    causing the first file to be transferred from the computing system to a recipient device operated by the recipient.

6. The method of claim 1, wherein:
    determining that the first file is to be transferred between the computing system and the second device comprises determining that the first file is to be transferred from the computing system to the second device; and
    causing the first file to be transferred between the computing system and the second device comprises causing the first file to be transferred from the computing system to the second device.

7. The method of claim 6, further comprising:
    determining that the file transfer request indicates that the first file is to be transferred from the computing system to the second device.

8. The method of claim 1, further comprising:
    determining that a first bandwidth of a first communication channel between the second device and the computing system is greater than a second bandwidth of a second communication channel between the first device and the computing system;
    wherein determining that the first file is to be transferred between the computing system and the second device is based at least in part on the first bandwidth being greater than the second bandwidth.

9. The method of claim 8, further comprising:
    sending, to the first device, a request for a confirmation by the first user that the first file is to be transferred between the computing system and the second device; and
    receiving, from the first device, the confirmation;
    wherein determining that the first file is to be transferred between the computing system and the second device is further based at least in part on receipt of the confirmation.

10. The method of claim 8, further comprising:
    receiving, by the computing system and over the network, third logon credentials input by the user to a third device, the third device being different than each of the first device and the second device;
    determining, by the computing system, that the third logon credentials match the stored authentication credentials;
    establishing a third session between the computing system and a third application associated with the third device based at least in part on the third logon credentials matching the stored authentication credentials, the third session enabling the third device to be operated to access the one or more files associated with the account;

determining, while the first session is active, that the second and third sessions are both also active; and determining that the first bandwidth is greater than a third bandwidth of a third communication channel between the third device and the computing system;

wherein determining that the first file is to be transferred between the computing system and the second device is further based at least in part on the second and third sessions both being active while the first session is active and the first bandwidth being greater than the third bandwidth.

11. A computing system, comprising:

at least one processor; and at least one computer-readable medium encoded with instructions, which, when executed by the at least one processor, cause the computer system to:

receive, over a network, first logon credentials input by a user to a first device;

determine that the first logon credentials match stored authentication credentials for an account of the user;

establish a first session between the computing system and a first application associated with the first device based at least in part on the first logon credentials matching the stored authentication credentials, the first session enabling the first device to be operated to access one or more files associated with the account, wherein the one or more files are stored in a storage medium associated with the computing system;

receive, over the network, second logon credentials input by the user to a second device, the second device being different than the first device;

determine that the second logon credentials match the stored authentication credentials;

establish a second session between the computing system and a second application associated with the second device based at least in part on the second logon credentials matching the stored authentication credentials, the second session enabling the second device to be operated to access the one or more files associated with the account;

determine, while the first session is active, that the second session is also active;

cause, based at least in part on the second session being active while the first session is active, the first device to display an indication that a first file is available to be transferred between the computing system and the second device;

receive, from the first device, a file transfer request that identifies the first file;

determine that the first file is to be transferred between the computing system and the second device; and cause the first file to be transferred between the computing system and the second device.

12. The computing system of claim 11, wherein the at least one computer-readable medium is encoded with additional instruction which, when executed by the at least one processor, further cause the computing system to:

determine that the first file is to be transferred between the computing system and the second device at least in part by determining that the first file is to be transferred from the second device to the computing system; and cause the first file to be transferred between the computing system and the second device at least in part by causing the first file to be transferred from the second device to the computing system.

13. The computing system of claim 12, wherein the at least one computer-readable medium is encoded with additional instruction which, when executed by the at least one processor, further cause the computing system to:

receive, from the second device, metadata describing a plurality of files stored by the second device and including first data identifying the first file; and determine that the file transfer request includes the first data.

14. The computing system of claim 13, wherein the at least one computer-readable medium is encoded with additional instruction which, when executed by the at least one processor, further cause the computing system to:

send the metadata to the first device.

15. The computing system of claim 12, wherein the at least one computer-readable medium is encoded with additional instruction which, when executed by the at least one processor, further cause the computing system to:

determine that the file transfer request identifies a recipient with whom the first file is to be shared; and cause the first file to be transferred from the computing system to a recipient device operated by the recipient.

16. The computing system of claim 11, wherein the at least one computer-readable medium is encoded with additional instruction which, when executed by the at least one processor, further cause the computing system to:

determine that the first file is to be transferred between the computing system and the second device at least in part by determining that the first file is to be transferred from the computing system to the second device; and cause the first file to be transferred between the computing system and the second device at least in part by causing the first file to be transferred from the computing system to the second device.

17. The computing system of claim 16, wherein the at least one computer-readable medium is encoded with additional instruction which, when executed by the at least one processor, further cause the computing system to:

determine that the file transfer request indicates that the first file is to be transferred from the computing system to the second device.

18. The computing system of claim 11, wherein the at least one computer-readable medium is encoded with additional instruction which, when executed by the at least one processor, further cause the computing system to:

determine that a first bandwidth of a first communication channel between the second device and the computing system is greater than a second bandwidth of a second communication channel between the first device and the computing system; and determine that the first file is to be transferred between the computing system and the second device further based at least in part on the first bandwidth being greater than the second bandwidth.

19. The computing system of claim 18, wherein the at least one computer-readable medium is encoded with additional instruction which, when executed by the at least one processor, further cause the computing system to:

send, to the first device, a request for a confirmation by the first user that the first file is to be transferred between the computing system and the second device;

receive, from the first device, the confirmation; and determine that the first file is to be transferred between the computing system and the second device further based at least in part on receipt of the confirmation.

20. The computing system of claim 18, wherein the at least one computer-readable medium is encoded with additional instruction which, when executed by the at least one processor, further cause the computing system to:

receive, over the network, third logon credentials input by the user to a third device, the third device being different than each of the first device and the second device;

determine that the third logon credentials match the stored authentication credentials;

establish a third session between the computing system and a third application associated with the third device based at least in part on the third logon credentials matching the stored authentication credentials, the third session enabling the third device to be operated to access the one or more files associated with the account;

determine, while the first session is active, that the second and third sessions are both also active;

determine that the first bandwidth is greater than a third bandwidth of a third communication channel between the third device and the computing system; and determine that the first file is to be transferred between the computing system and the second device further based at least in part on the second and third sessions both being active while the first session is active and the first bandwidth being greater than the third bandwidth.

21. The computing system of claim 11, wherein the at least one computer-readable medium is encoded with additional instruction which, when executed by the at least one processor, further cause the computing system to:

determine that the first file is to be transferred between the computing system and the second device based at least in part on the file transfer request.

22. The method of claim 1, wherein the computing system determines that the first file is to be transferred between the computing system and the second device based at least in part on the file transfer request.

23. At least one non-transitory computer-readable medium encoded with instructions which, when executed by at least one processor of a computing system, cause the computing system to:

receive, over a network, first logon credentials input by a user to a first device;

determine that the first logon credentials match stored authentication credentials for an account of the user;

establish a first session between the computing system and a first application associated with the first device based at least in part on the first logon credentials matching the stored authentication credentials, the first session enabling the first device to be operated to access one or more files associated with the account, wherein the one or more files are stored in a storage medium associated with the computing system;

receive, over the network, second logon credentials input by the user to a second device, the second device being different than the first device;

determine that the second logon credentials match the stored authentication credentials;

establish a second session between the computing system and a second application associated with the second device based at least in part on the second logon credentials matching the stored authentication credentials, the second session enabling the second device to be operated to access the one or more files associated with the account;

determine, while the first session is active, that the second session is also active;

cause, based at least in part on the second session being active while the first session is active, the first device to display an indication that a first file is available to be transferred between the computing system and the second device;

receive, from the first device, a file transfer request that identifies the first file;

determine, by the computing system, that the first file is to be transferred between the computing system and the second device; and cause the first file to be transferred between the computing system and the second device.

* * * * *